(12) United States Patent
Peemans et al.

(10) Patent No.: US 6,787,633 B2
(45) Date of Patent: Sep. 7, 2004

(54) METHOD AND APPARATUS FOR PREPARING A POLY(ARYLENE ETHER)

(75) Inventors: Rudy Francois Alain Jos Peemans, Erps-Kwerps (BE); Wiebe Knol, Bergen op Zoom (NL); Peter Groefsema, Halsteren (NL)

(73) Assignee: General Electric Company, Pittsfield, MA (US)

(*) Notice: Subject to any disclaimer, the term of this patent is extended or adjusted under 35 U.S.C. 154(b) by 0 days.

(21) Appl. No.: 10/065,062

(22) Filed: Sep. 13, 2002

(65) Prior Publication Data

US 2004/0054121 A1 Mar. 18, 2004

(51) Int. Cl.[7] ................ C08G 65/38; C08G 65/46; C08G 65/48
(52) U.S. Cl. ............. 528/491; 528/493; 528/495; 528/497; 528/498; 528/499; 528/502 R; 528/502 F
(58) Field of Search .................. 528/491, 493, 528/495, 496, 497, 498, 499, 502 R, 502 F

(56) References Cited

U.S. PATENT DOCUMENTS

| | | |
|---|---|---|
| 3,306,874 A | 2/1967 | Hay |
| 3,789,054 A | 1/1974 | Izawa et al. |
| 3,923,738 A | 12/1975 | Van Sorge |
| 4,603,194 A | 7/1986 | Mendiratta et al. |
| 4,788,277 A | 11/1988 | Ibe et al. |
| 5,619,043 A | 4/1997 | Preikschat et al. |
| 5,815,264 A | 9/1998 | Reed et al. |
| 5,959,157 A | 9/1999 | Lau et al. |
| 5,986,045 A | 11/1999 | Lau et al. |
| 6,124,421 A | 9/2000 | Lau et al. |

FOREIGN PATENT DOCUMENTS

| | | |
|---|---|---|
| EP | 0 153 074 | 2/1985 |
| EP | 0 289 200 | 4/1988 |
| EP | 0 594 249 | 10/1993 |
| EP | 0 755 957 B1 | 5/1999 |
| EP | 1 063 512 | 5/2000 |
| WO | WO 03/014191 A1 | 2/2003 |

OTHER PUBLICATIONS

International Search Report, International Application No. PCT/US 03/20360; International Filing Date Jun. 27, 2003; Date of Mailing Sep. 17, 2003.
Derwent Abstract for JP 2000281773.
http://www.lasentec.com.

*Primary Examiner*—Duc Truong

(57) ABSTRACT

A method of precipitating a poly(arylene ether) includes preparing a poly(arylene ether) solution comprising a poly (arylene ether) and a solvent, combining the poly (arylene ether) solution with an antisolvent to form a poly(arylene ether) dispersion comprising a poly(arylene ether) solid, separating the poly(arylene ether) solid from the poly (arylene ether) dispersion to form an isolated poly(arylene ether) solid, determining a particle size distribution of the poly(arylene ether) solid prior to separating the poly(arylene ether) solid from the poly(arylene ether) dispersion, and adjusting a precipitation parameter in response to the particle size distribution. Although the measured particle size distribution is very different from the particle size distribution of the solid poly(arylene ether) ultimately isolated, it is useful for controlling the process. The method may be automated to rapidly adjust precipitation conditions in response to the particle size distribution measurements. An apparatus for carrying out the method is also described.

43 Claims, 11 Drawing Sheets

Control of Particle Size During Grade Change with MeOH Addition to the High Shear Pump ◆ Particle Size in High Shear Pump (micrometers)

▲ MeOH to High Shear Pump (m³/hr)

METHOD AND APPARATUS FOR PREPARING A POLY(ARYLENE ETHER)

BACKGROUND

Poly(arylene ether) resins may be prepared by the oxidative polymerization of a monohydric phenol in the presence of a solvent to form a solution in which the product poly(arylene ether) is soluble. The poly(arylene ether) may then be isolated by combining the solution with an antisolvent to precipitate the poly(arylene ether). In practice, it is very challenging to control these precipitations to provide a final poly(arylene ether) solid having consistent particle size. In some cases, substantial quantities of unacceptable poly(arylene ether) may be produced before the problem is recognized or addressed. In other cases, poly(arylene ether) particles may be formed that adversely affect the process by, for example, blocking transport pipes or a filtration unit. There is a need for a method of precipitating a poly(arylene ether) that enables rapid adjustment of precipitation conditions to maintain a desired particle size distribution within the process and in the final product.

BRIEF SUMMARY

The above-described and other drawbacks and disadvantages are alleviated by a method comprising: preparing a poly(arylene ether) solution comprising a poly(arylene ether) and a solvent; combining the poly(arylene ether) solution with an antisolvent to form a poly(arylene ether) dispersion comprising a poly(arylene ether) solid; separating the poly(arylene ether) solid from the poly(arylene ether) dispersion to form an isolated poly(arylene ether) solid; determining a particle size distribution of the poly(arylene ether) solid prior to the separating the poly(arylene ether) solid from the poly(arylene ether) dispersion; and adjusting a precipitation parameter in response to the particle size distribution.

Other embodiments, including an apparatus for carrying out the method, are described in detail below.

BRIEF DESCRIPTION OF THE DRAWINGS

Referring now to the drawings wherein like elements are numbered alike in several FIGURES.

DETAILED DESCRIPTION OF THE PREFERRED EMBODIMENTS

Figure 1:
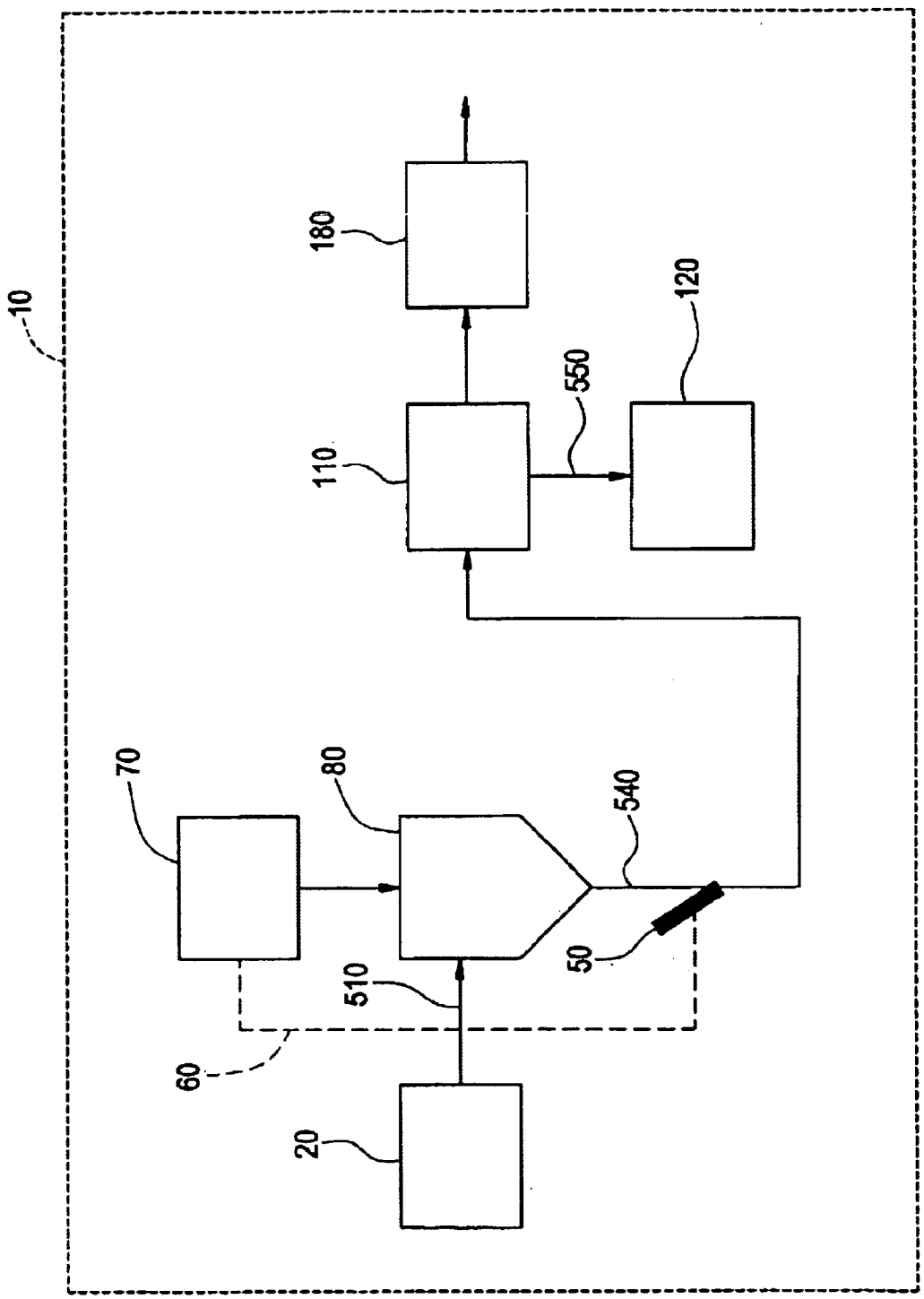
FIG. 1 is a simplified diagrammatic view of a poly (arylene ether) plant comprising a particle size distribution determination unit 50 interposed between a precipitation tank and a filtration unit 110.

Having extensively studied the precipitation of poly (arylene ether) resins under laboratory-scale, pilot plant, and manufacturing conditions, the present inventors have observed that it can be very difficult to control the precipitation process in order to provide an isolated poly(arylene ether) resin having a consistent, desirable particle size. Nominally identical precipitation conditions may produce different product particles sizes from hour-to-hour, day-to-day, and month-to-month. Poorly understood particle size variations may also be associated with different plants running the same process. While not wishing to be bound by any particular hypothesis, the present inventors believe that this irreproducibility may be related to the complexity of the precipitation mechanism. When a poly(arylene ether)-solvent solution is mixed with an antisolvent, several processes occur in the resulting dispersion, including, for example, diffusion of antisolvent into the droplets of poly (arylene ether) solution, precipitation of poly(arylene ether) inside the poly(arylene ether) solution droplets, coagulation of poly(arylene ether) solution droplets, and hardening of poly(arylene ether) solution droplets into which antisolvent has diffused, and attrition of the particles in process pipes, stirrers, and pumps. These processes may take several minutes to complete. As a result, the final product poly(arylene ether) is very sensitive to changes in precipitation conditions.

It has been observed that changes in precipitation conditions may have a significant effect on the fundamental product characteristics, such as the content of so-called fines (i.e., finished product particles smaller than about 38 micrometers), bulk density, and residual toluene, as well as less fundamental but no less important properties as transportability and flowability.

Also, during the manufacturing process, significant process problems may occur when even when small and unintended changes take place in precipitation parameters such as antisolvent composition, antisolvent to poly(arylene ether) solution ratio, poly (arylene ether) intrinsic viscosity, precipitation pump shear rate, precipitation pump suction pressure, and the like. These process problems include, for example, blockages of pipelines when the particle size (or particle aggregate size) of the precipitate is too large, blockage of filters when the particle size is too small, or inconsistent drying or transport behavior when the precipitate is either too coarse or too fine.

Before the present invention was made, it was common to monitor the precipitation process by visual inspection of precipitation vessels and filters to detect large beads or fine precipitate. After such visual inspection, it would be decided whether and how to adjust the precipitation conditions. Using this approach, changes in precipitation conditions might not be made for over one hour after a problem was detectable.

The present inventors have found that rapid methods of particle size determination may be employed to analyze the poly(arylene ether) dispersion at an early stage of the precipitation, and that the resulting particle size distribution data may be employed to adjust the precipitation conditions in order to maintain a consistent, desirable particle size distribution in the final poly(arylene ether) product. This is particularly surprising given that the poly(arylene ether) particle size may increase substantially, then decrease substantially before the solid particles are separated from the dispersion liquid. In particular, particles that are determined to have a mean size of roughly 50 to 100 micrometers when analyzed soon after the poly (arylene ether) dispersion is formed may grow to sizes as large as several centimeters—large enough to block transfer lines—in the next few minutes, and this growth phase may be followed by an attrition phase in which particles may break down to sizes of roughly 40 micrometers or smaller—small enough to make transport and drying difficult.

One embodiment is a method comprising: preparing a poly(arylene ether) solution comprising a poly(arylene ether) and a solvent; combining the poly(arylene ether) solution with an antisolvent to form a poly(arylene ether) dispersion comprising a poly (arylene ether) solid; separating the poly(arylene ether) solid from the poly(arylene ether) dispersion to form an isolated poly(arylene ether) solid; determining a particle size distribution of the poly(arylene ether) solid prior to the separating the poly (arylene ether) solid from the poly(arylene ether) dispersion; and adjusting a precipitation parameter in response to the particle size distribution.

FIG. 1 is a simple diagram illustrating an apparatus suitable for carrying out the method. In a poly(arylene ether) plant 10, a monohydric phenol is polymerized in the presence of a solvent in reactor 20 to form a poly(arylene ether) solution 510. The poly(arylene ether) solution 510 flows to a first precipitation tank 80, where it is combined with an antisolvent flowing from antisolvent tank 70 to form a poly(arylene ether) dispersion 540. The poly(arylene ether) dispersion 540 is analyzed by particle size distribution determination unit 50 as it flows to filtration unit 110. In filtration unit 110, the poly(arylene ether) dispersion 540 is separated into a poly(arylene ether) solid, which flows to dryer 180, and a filtrate 550, which flows into filtrate tank 120.

The results of the particle size determination are conveyed via feedback loop 60 to antisolvent tank 70, where a precipitation parameter may be adjusted in response to the results. See below for a detailed discussion of adjusting a precipitation parameter.

Figure 2:
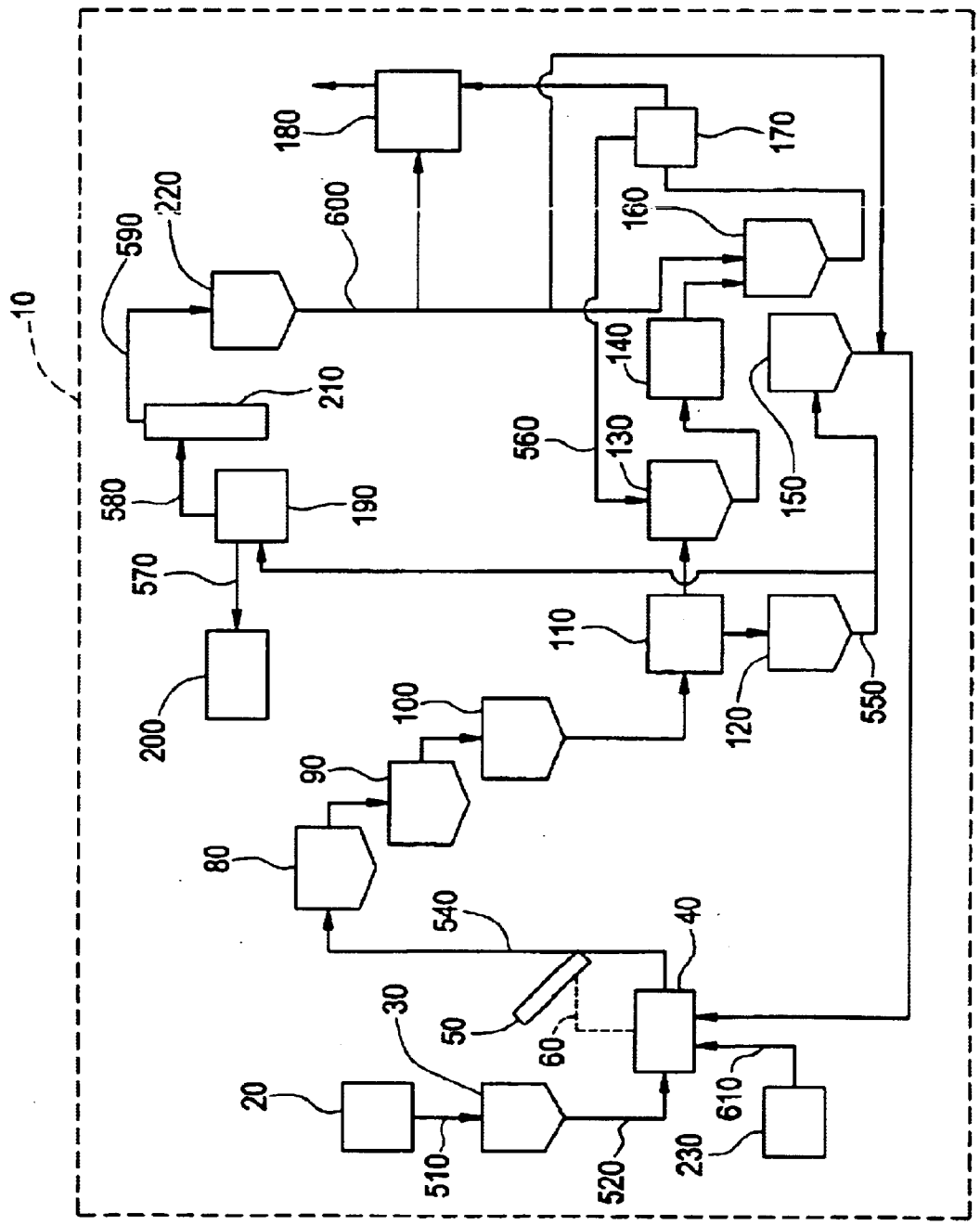
FIG. 2 is a simplified diagrammatic view of a poly (arylene ether) plant comprising a particle size distribution determination unit 50 interposed between a mixing pump 40 and a first precipitation tank 80.

A preferred apparatus for carrying out the method is depicted in FIG. 2. Polymerization of a monohydric phenol in the presence of a solvent occurs in reactor 20 to form poly(arylene ether) solution 510. The poly(arylene ether) solution 510 flows to preconcentration unit 30, where a portion of the solvent is removed, leaving concentrated poly(arylene ether) solution 520. In mixing pump 40, the concentrated poly(arylene ether) solution 520 is combined with recycled antisolvent 530, and, optionally, supplemental antisolvent 610, to form poly(arylene ether) dispersion 540, which flows via particle size determination unit 50 to first precipitation tank 80, second precipitation tank 90, and third precipitation tank 100 on its way to filtration unit 110. In filtration unit 110, the poly(arylene ether) dispersion 540 is filtered to yield a solid poly(arylene ether) and a filtrate 550, which flows into filtrate tank 120. The solid poly(arylene ether) flows to first reslurry tank 130, where it is combined with second centrifuge effluent 560 (which is an antisolvent-rich stream 580 capable of removing impurities from the poly(arylene ether) solid) to form a slurry. The mixture flows to first centrifuge 140, where the poly(arylene ether) solid is separated from the slurry liquid, which flows to first centrifuge 140 effluent tank 150 before it is combined with a portion of recovered antisolvent 600 to form recycled antisolvent 530. The solid poly(arylene ether) produced in first centrifuge 140 is transported to second reslurry tank 160, where it is combined with a portion of recovered antisolvent 600 to form a slurry, which is separated in second centrifuge 170 into poly(arylene ether) solid, which flows to dryer 180, and second centrifuge effluent 560, which flows to first reslurry tank 130. A portion of filtrate 550, formed in filtration unit 110, flows to first centrifuge effluent tank 150, and another portion of filtrate 550 flows to decanter 190, which separates a solvent-rich stream 570 and an antisolvent-rich stream 580. Separation of the solvent-rich stream 570 and the antisolvent-rich stream 580 may be facilitated by addition of water to the decanter 190, which aids in the separation of solvent and antisolvent phases. An appropriate quantity of water may be readily determined by those skilled in the art. The solvent-rich stream 570 is directed to solvent recovery unit 200, where it may be treated, for example, for recycling to reactor 20 (recycling not shown). The antisolvent-rich stream 580 is fed to distillation column 210, which produces distilled antisolvent 590 and feeds it to antisolvent recovery tank 220. The recovered antisolvent 600 from antisolvent recovery tank 220 may, optionally, flow to dryer 180 (where it may be employed to scrub polymer fines from the gas/vapor stream exiting dryer 180), to second reslurry tank 160, and, after combinations with recycled antisolvent 530, to mixing pump 40. Though not shown, the contents of antisolvent recovery tank 220 may also be pumped to supplemental antisolvent tank 230. The results of the particle size determination may be conveyed via feedback loop 60 to mixing pump 40, which in turn may control one or more of the amounts of concentrated poly(arylene ether) solution 520 and recycled antisolvent 530 and supplemental antisolvent 610, enabling adjustment of one or more precipitation parameters. For example, if the particle size exceeds a desirable range, additional methanol may be added to the antisolvent composition from either or both of the recycled antisolvent 530 and the supplemental antisolvent 610.

The particle size distribution is determined before the poly(arylene ether) dispersion is filtered. This determination may be performed within about 1000, 500, 240, 120, 60, 30, 15, or even 1 second of combining the poly(arylene ether) solution with the antisolvent.

The particle size distribution is preferably determined "in-line". In other words, it is preferably determined without removing the poly(arylene ether) dispersion from the process flow or substantially diverting the poly(arylene ether) dispersion within the process flow.

The particle size distribution determination is preferably determined in "real-time". For example, the time between initiation and completion of a particle size distribution determination may be less than 10 seconds, 5 seconds, or even 1 second. Particle size analysis techniques such as, for example, laser back-scattering, are capable of providing such real-time particle size analysis.

In one embodiment, the particle size distribution determination is conducted continuously. This is particularly useful in a continuous process for preparing a poly (arylene ether).

There is no particular limitation on the particle size analysis technique used in the method. Preferred techniques include laser diffraction and laser back-scattering techniques, especially laser back-scattering techniques providing particle counting. Such techniques are known in the art and particle size analysis instruments employing them are commercially available as, for example, the particle counting, laser back-scattering instruments sold as FBRM® D600R and M600P by Lasentec, Microtrac X100 analyzer by Infra Scientific, and Coulter LS200 by Beckman Coulter.

The method comprises adjusting a precipitation parameter in response to the particle size distribution. Such precipitation parameters include, for example, the antisolvent composition; the antisolvent temperature; the poly(arylene ether) solution composition; the poly(arylene ether) solution temperature; the weight or volume ratio of poly(arylene ether) solution to antisolvent; the mixing conditions (e.g., shear rate during combination of the poly(arylene ether) solution and the antisolvent); the aging conditions (e.g., temperature and/or time in one or more precipitation tanks); the pressures entering, within, and exiting the mixing pump 40, and the like.

In one embodiment, adjusting the antisolvent composition increases the solubility of the poly(arylene ether) in the first poly(arylene ether) dispersion and/or decreases the coagulation tendency of the poly(arylene ether) in the first poly (arylene ether) dispersion.

In another embodiment, adjusting the antisolvent composition decreases the solubility of the poly(arylene ether) in the first poly(arylene ether) dispersion and/or increases the coagulation tendency of the poly(arylene ether) in the first poly(arylene ether) dispersion.

In another embodiment, the antisolvent comprises water, and adjusting the antisolvent composition comprises changing the water concentration.

In another embodiment, the antisolvent comprises toluene, and adjusting the antisolvent composition comprises changing the toluene concentration.

In another embodiment, the antisolvent comprises an alkanol, and adjusting the antisolvent composition comprises changing the alkanol concentration.

In another embodiment, adjusting the poly(arylene ether) solution composition comprises adding solvent to or removing solvent from (e.g., using heat and/or reduced pressure) the poly(arylene ether) solution.

In another embodiment, adjusting the poly(arylene ether) solution pressure comprises adjusting the inlet pressure or outlet pressure of the mixing pump 40.

There is no particular limit on the type of poly(arylene ether) used in the method. In one embodiment, the poly (arylene ether) is a polymerization product of at least one monohydric phenol having the formula

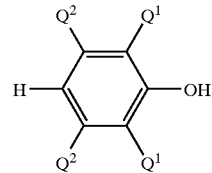

wherein each $Q^1$ is independently selected from the group consisting of halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, and $C_2$–$C_7$ halohydrocarbonoxy wherein at least two carbon atoms separate the halogen and oxygen atoms; and each $Q^2$ is independently selected from the group consisting of hydrogen, halogen, $C_1$–$C_7$ primary or secondary alkyl, phenyl, $C_1$–$C_7$ haloalkyl, $C_1$–$C_7$ hydrocarbonoxy, and $C_2$–$C_7$ halohydrocarbonoxy wherein at least two carbon atoms separate the halogen and oxygen atoms.

There is no particular limit on the intrinsic viscosity of the poly(arylene ether). For example, the poly(arylene ether) may have an intrinsic viscosity measured at 25° C. in chloroform of about 0.2 to about 1.0 deciliters per gram (dL/g). Within the range, the intrinsic viscosity may be at least about 0.25, 0.30, or 0.35 dL/g. Also within this range, the intrinsic viscosity may be up to about 0.8, or 0.65 dL/g.

The method is particularly useful for controlling the precipitation of low intrinsic viscosity poly(arylene ether) resins. Thus, in one embodiment, the poly(arylene ether) has an intrinsic viscosity of up to 0.35 dL/g, or up to 0.30 dL/g.

The poly(arylene solution) may comprise any concentration of poly(arylene ether). For example, the poly(arylene ether) solution may comprise about 10 to about 50 weight percent of the poly(arylene ether), based on the total weight of the poly(arylene ether) solution. Within this range, a poly(arylene ether) concentration may be at least about 20 weight percent, or at least about 25 weight percent. Also within this range, a poly(arylene ether) concentration may be up to about 45 weight percent, or up to about 40 weight percent.

There is no particular limit on the solvent employed in the method. Suitable organic solvents include aliphatic alcohols, ketones, aliphatic and aromatic hydrocarbons, chlorohydrocarbons, nitrohydrocarbons, ethers, esters, amides, mixed ether-esters, sulfoxides, and the like, and combinations thereof, providing they do not interfere with or enter into the oxidation reaction.

In a preferred embodiment, the solvent comprises a $C_6$–$C_{18}$ aromatic hydrocarbon, including, for example, toluene, xylenes, and the like, and mixtures thereof. A highly preferred solvent is toluene.

In one embodiment, the solvent may comprise, in addition to a $C_6$–$C_{18}$ aromatic hydrocarbon, a $C_3$–$C_8$ aliphatic alcohol that is a poor solvent for the poly(arylene ether), such as, for example, n-propanol, isopropanol, n-butanol, t-butanol, n-pentanol, and the like, and combinations thereof. A preferred $C_3$–$C_8$ aliphatic alcohol is n-butanol. The solvent may further comprise, in addition to a $C_6$–$C_{18}$ aromatic hydrocarbon and a $C_3$–$C_8$ aliphatic alcohol, methanol or ethanol, which act as an anti-solvent for the poly(arylene ether). The $C_6$–$C_8$ aromatic hydrocarbon, the $C_3$–$C_8$ aliphatic alcohol, and the methanol or ethanol may be combined in any proportion, but it may be preferred that the solvent comprise at least about 50 weight percent of the $C_6$–$C_{18}$ aromatic hydrocarbon.

In another embodiment, the solvent is substantially free of any $C_1$–$C_6$ alkanol. By substantially free, it is meant that the solvent comprises less than about 0.1 weight percent of a $C_1$–$C_6$ alkanol. In this embodiment, it is preferred that the solvent comprises no intentionally added $C_1$–$C_6$ alkanol.

The poly(arylene ether) solution is preferably a homogeneous solution. In other words, the poly(arylene ether) solution is preferably free of undissolved solid particles, especially particles having any dimension greater than 1 micrometer.

There is no particular limit on the antisolvent employed in the method. Suitable antisolvents include lower alkanols having one to about ten carbon atoms, such as methanol, and the like; ketones having three to about ten carbon atoms, such as acetone, and the like; and alkanes having five to about ten carbon atoms, such as hexane; and the like; and combinations thereof. A preferred antisolvent comprises methanol. A highly preferred antisolvent comprises about 60 to 99.8 weight percent methanol, 0.1 to about 30 weight percent toluene, and 0.1 to about 10 weight percent water.

The antisolvent may be employed at a range of amounts relative to the amount of the organic solvent, with the optimum amount depending on the identities of the organic solvent and antisolvent, as well as the concentration, intrinsic viscosity, and monomer composition of the poly(arylene ether) product. For example, when the poly (arylene ether) is a random copolymer having an intrinsic viscosity of 0.36 dL/g and a composition of 82 weight percent 2,6-dimethyl-1,4-phenylene ether units and 18 weight percent 2,3,6-dimethyl-1,4-phenylene ether units, the organic solvent is toluene, and the antisolvent is methanol, a toluene:methanol weight ratio of about 1:1.5 to about 1:7 may be suitable.

The temperatures of the poly(arylene ether) solution and the antisolvent immediately before they are combined will vary according to many factors, including, for example, the poly(arylene ether) composition, the poly(arylene ether) intrinsic viscosity, the poly(arylene ether) concentration in the solution, the solvent type, the antisolvent type, and the weight ratio of poly(arylene ether) solution to antisolvent. In one embodiment, the method comprises combining the poly(arylene ether) at a temperature of about 60 to about 100° C. with the antisolvent at a temperature of about 15 to about 60° C. Within these ranges, the poly(arylene ether) solution temperature may be at least about 70° C., or at least about 80° C.; and the poly (arylene ether) solution temperature may be up to about 95° C., or up to about 90° C. Also within these ranges, the antisolvent temperature may be at least about 20° C., or at least about 25° C.; and the antisolvent temperature may be up to about 55° C., or up to about 50° C. The temperature of the combined poly(arylene ether)-antisolvent mixture may preferably be about 30 to about 55° C.

In one embodiment, the poly(arylene ether) solution and the antisolvent are combined under high shear mixing conditions. For example the poly(arylene ether) solution and the antisolvent may be mixed with a shear rate of about 500 $sec^{-1}$ to about 50,000 $sec^{-1}$. Within this range, the shear rate may be at least about 2,000 $sec^{-1}$, or at least about 10,000 $sec^{-1}$. Also within this range, the shear rate may be up to about 40,000 $sec^{-1}$, or up to about 20,000 $sec^{-1}$.

In other embodiment, combining the poly(arylene ether) solution with the antisolvent comprises mixing in a stirred tank.

In a preferred embodiment, adjusting a precipitation parameter is performed within about 60, 30, 15, or 5 seconds of determining the particle size distribution.

In a highly preferred embodiment, a precipitation parameter is automatically adjusted (i.e., adjusted without human intervention) in response to the particle size distribution determination.

The method comprises separating the poly(arylene ether) solid from the poly (arylene ether) dispersion. In one embodiment, separating the poly(arylene ether) solid from the poly(arylene ether) dispersion comprises filtration. In another embodiment, separating the poly(arylene ether) solid from the poly(arylene ether) dispersion comprises centrifugation. Suitable filtration apparatuses include rotating filters, continuous rotary vacuum filters, continuous moving bed filters, batch filters, and the like. Suitable solid/liquid separation apparatuses include continuous solid/liquid centrifuges.

The method allows control of the particle size distribution of the isolated poly (arylene ether) solid. The desired particle size distribution may vary as a function of, for example, the poly(arylene ether) composition and intrinsic viscosity. In one embodiment, the isolated poly(arylene ether) solid has a number-average mean particle size of about 10 micrometers to about 100 micrometers. Within this range, the mean particle size may be at least about 15 micrometers, or at least about 40 micrometers. Also within this range, the mean particle size may be up to about 90 micrometers, or up to about 80 micrometers, or up to about 70 micrometers.

In one embodiment, the method further comprises determining a particle size distribution of the isolated poly (arylene ether) solid. For example, with reference to FIG. 2, a particle size distribution determination unit 50 may be interposed between second reslurry tank 160 and second centrifuge 170. Alternatively, the particle size distribution may be determined at intermediate stages in the process, such as within first precipitation tank 80, between first precipitation tank 80 and filtrate tank 120, between filtrate tank 120 and second reslurry tank 160, or between second reslurry tank 160 and second centrifuge 170.

In one embodiment, the method comprises: preparing a poly(arylene ether) solution comprising a poly(arylene ether) and a solvent, wherein the solvent comprises a $C_6$–$C_{18}$ aromatic hydrocarbon; combining the poly(arylene ether) solution with an antisolvent to form a poly(arylene ether) dispersion, wherein the antisolvent comprises water and a compound selected from the group consisting of alkanols having one to about ten carbon atoms, ketones having three to about ten carbon atoms, alkanes having five to about ten carbon atoms, and combinations thereof; determining a particle size distribution in the poly(arylene ether) dispersion within about 30 seconds of the combining the poly (arylene ether) solution with the antisolvent; and adjusting a precipitation parameter in response to the particle size distribution.

In one embodiment, the method comprises: preparing a poly(arylene ether) solution comprising a poly(arylene ether) and a solvent, wherein the poly(arylene ether) is the polymerization product of a monohydric phenol comprising 2,6-dimethylphenol, 2,3,6-trimethylphenol, or a combination thereof, and wherein the solvent comprises toluene; combining the poly(arylene ether) solution with an antisolvent to form a poly(arylene ether) dispersion; wherein the antisolvent comprises methanol, toluene and water; determining a particle size distribution in the poly (arylene ether) dispersion within about 20 seconds of the combining the poly(arylene ether) solution with the antisolvent; and adjusting the antisolvent composition in response to the particle size distribution. In this embodiment, adjusting the antisolvent composition may, optionally, comprise adjusting the water content of the antisolvent, adjusting the toluene content of the antisolvent, or adjusting the methanol content of the antisolvent.

In another embodiment, the method comprises: oxidatively coupling a monohydric phenol using an oxygen-containing gas in the presence of a first solvent and a complex metal catalyst to produce a poly(arylene ether) solution; combining the poly(arylene ether) solution with a first antisolvent to form a poly(arylene ether) dispersion comprising a poly(arylene ether) solid; separating the poly (arylene ether) solid from the poly(arylene ether) dispersion to form an isolated poly(arylene ether) solid; determining a particle size distribution of the poly(arylene ether) solid prior to the separating the poly(arylene ether) solid from the poly(arylene ether) dispersion; and adjusting a precipitation parameter in response to the particle size distribution. In this embodiment, the method may, optionally, further comprise concentrating the poly(arylene ether solution) prior to the combining the poly(arylene ether) solution with the first antisolvent. Alternatively, the method may, optionally, further comprise diluting (e.g., with the first solvent) the poly(arylene ether) solution) prior to the combining the poly(arylene ether) solution with the first antisolvent.

Another embodiment is an apparatus for precipitating a poly(arylene ether), comprising: means for preparing a poly (arylene ether) solution comprising a poly (arylene ether) and a solvent; means for combining said poly(arylene ether) solution with an antisolvent to form a poly(arylene ether) dispersion comprising a poly(arylene ether) solid; means for separating said poly(arylene ether) solid from said poly (arylene ether) dispersion to form an isolated poly(arylene ether) solid; means for determining a particle size distribution of said poly(arylene ether) solid prior to said separating said poly(arylene ether) solid from said poly(arylene ether) dispersion; and means for adjusting a precipitation parameter in response to said particle size distribution.

Another embodiment is an apparatus for preparing a poly(arylene ether), comprising: a reactor for polymerizing a monohydric phenol in a solvent to form a poly(arylene ether) solution; a preconcentration unit in fluid communication with said reactor, for concentrating said poly(arylene ether) solution by removing a portion of said solvent; a mixing pump in fluid communication with said preconcentration unit, for combining said poly(arylene ether) solution with an antisolvent to form a poly (arylene ether) dispersion comprising a poly(arylene ether) solid, wherein said pump mixes said poly(arylene ether) solution with said antisolvent at a shear rate of about 500 to about 50,000 $\sec^{-1}$; a precipitation tank in fluid communication with said mixing pump, for aging said poly(arylene ether) dispersion; a filtration unit in fluid communication with said precipitation tank, for separating said poly(arylene ether) solid from said solvent and said antisolvent; a particle size distribution determination unit for determining a particle size distribution of said poly(arylene ether) solid, wherein said particle size distribution determination unit is interposed between said pump and said precipitation tank; and a feedback loop in operative communication with said particle size distribution determination unit and said mixing pump, for adjusting a precipitation parameter in response to said particle size distribution.

Another embodiment is an apparatus for preparing a poly(arylene ether), comprising: a reactor for polymerizing a monohydric phenol in a solvent to form a poly(arylene ether) solution; a preconcentration unit in fluid communication with said reactor, for concentrating said poly(arylene ether) solution by removing a portion of said solvent; a mixing pump in fluid communication with said preconcentration unit, for combining said poly(arylene ether) solution with an antisolvent to form a poly (arylene ether) dispersion comprising a poly(arylene ether) solid; a precipitation tank unit in fluid communication with said mixing pump, for aging said poly(arylene ether) dispersion; a filtration unit in fluid communication with said precipitation tank, for separating said poly(arylene ether) solid from said solvent and said antisolvent; a particle size distribution determination unit for determining a particle size distribution of said poly(arylene ether) solid, wherein said particle size distribution determination unit is interposed between said precipitation tank and said filtration unit; and a feedback loop in operative communication with said particle size determination unit and said mixing pump, for adjusting a precipitation parameter in response to said particle size distribution.

Another embodiment is an apparatus for preparing a poly(arylene ether), comprising: a reactor for polymerizing a monohydric phenol in a solvent to form a poly(arylene ether) solution; a flash vessel in fluid communication with said reactor, for concentrating said poly(arylene ether) solution by removing a portion of said solvent to form a concentrated poly(arylene ether solution 520; a mixing pump in fluid communication with said flash drum, for combining said concentrated poly (arylene ether) solution 520 with an antisolvent to form a poly(arylene ether) dispersion comprising a poly(arylene ether) solid, wherein said mixing pump mixes said poly(arylene ether) solution with said antisolvent at a shear rate of about 500 to about 50,000 $\sec^{-1}$; a first precipitation tank in fluid communication with said mixing pump, for aging said poly(arylene ether) dispersion; a second precipitation tank in fluid communication with said first precipitation tank, for aging said poly (arylene ether) dispersion; a third precipitation tank in fluid communication with said second precipitation tank, for aging said poly(arylene ether) dispersion; a filtration unit in fluid communication with said third precipitation tank for separating said poly (arylene ether) solid from said solvent and said poly(arylene ether) dispersion; a filtrate tank in fluid communication with said rotary vacuum filter, for receiving said solvent and said antisolvent from said rotary vacuum filter; a first reslurry tank in fluid communication with said filtration unit, for combining said poly(arylene ether) solid with a second antisolvent; a first centrifuge in fluid communication with said first reslurry tank, for separating said poly(arylene ether) solid from said second antisolvent; a first centrifuge effluent tank in fluid communication with said first centrifuge, for receiving said second antisolvent from said first centrifuge; a second reslurry tank in fluid communication with said first centrifuge, for combining said poly (arylene ether) solid with a third antisolvent; a second centrifuge in fluid communication with said second reslurry tank, for separating said poly(arylene ether) solid from said third antisolvent; a dryer in fluid communication with said second centrifuge, for removing volatiles from said poly (arylene ether) solid; a particle size distribution determination unit interposed between said pump and said first precipitation tank; and a feedback loop in operative communication with said particle size distribution determination unit and said mixing pump, for adjusting the antisolvent composition in response to said particle size distribution.

The invention is further illustrated by the following non-limiting examples.

EXAMPLES 1 TO 9

Using an apparatus similar to that depicted in FIG. 2, a poly(arylene ether) manufacturing process was operated continuously to produce poly(2,6-dimethyl-1,4-phenylene ether) having an intrinsic viscosity of about 0.30 deciliters/gram (dL/g) measured at 25° C. in chloroform. The apparatus included a reactor for producing a poly(arylene ether)

solution by oxidative polymerization of 2,6-dimethylphenol in toluene; a high shear mixing pump for combining the poly(arylene ether) solution with an antisolvent; a laser backscattering particle size distribution unit, obtained from Lasentec as M600P FBRM®; first, second, and third precipitation tanks; a rotary vacuum filter as the filtration unit; a filtrate tank; a first reslurry tank; a first centrifuge; a first centrifuge effluent tank; a second reslurry tank; a second centrifuge; a drying section; a decanter; a solvent recovery unit; a distillation column; and an antisolvent recovery tank. The location of the particle size distribution instrument and the process flow were such that the poly(arylene ether) dispersion was analyzed approximately 15 seconds after initial mixing of the poly(arylene ether) solution and the antisolvent.

The following antisolvent composition parameters were varied as detailed in Table 1 to determine their effects on the mean particle size determined approximately 15 seconds after initial mixing of the poly(arylene ether) solution and the antisolvent. Because the antisolvent consisted of toluene, methanol, and water, the methanol concentration in weight percent is simply $100-[H_2O]-[toluene]$. Raw data are presented in Table 1. Analysis by linear regression yielded the following regression equation:

$$PS=(-719.6\pm91.4)+(70.0\pm12.7)[H_2O]+(36.0\pm5.2)[toluene]$$

where PS is the mean particle size expressed in micrometers, $[H_2O]$ is the water concentration in the antisolvent expressed in weight percent, and [toluene] is the toluene concentration in the antisolvent expressed in weight percent.

These examples show that there is a highly significant statistical correlation between particles sizes measured soon after poly(arylene ether) dispersion formation and antisolvent composition. They also shows that particle size is extremely sensitive to antisolvent composition, with a 1% increase in toluene concentration causing a 36 micrometer increase in mean particle size, and a 1% increase in water concentration causing a 70 micrometer increase in mean particle size.

[t1]

TABLE 1

| | $[H_2O]$ (wt %) | [toluene] (wt %) | Particle size (micrometers) |
|---|---|---|---|
| Ex. 1 | 3.60 | 14.92 | 70 |
| Ex. 2 | 3.60 | 14.92 | 68 |
| Ex. 3 | 3.90 | 14.92 | 85 |
| Ex. 4 | 3.90 | 15.42 | 110 |
| Ex. 5 | 3.60 | 15.42 | 94 |
| Ex. 6 | 3.60 | 14.42 | 54 |
| Ex. 7 | 3.90 | 14.42 | 78 |
| Ex. 8 | 3.75 | 14.92 | 77 |
| Ex. 9 | 3.60 | 14.92 | 63 |

EXAMPLES 10 TO 17

Figure 3:
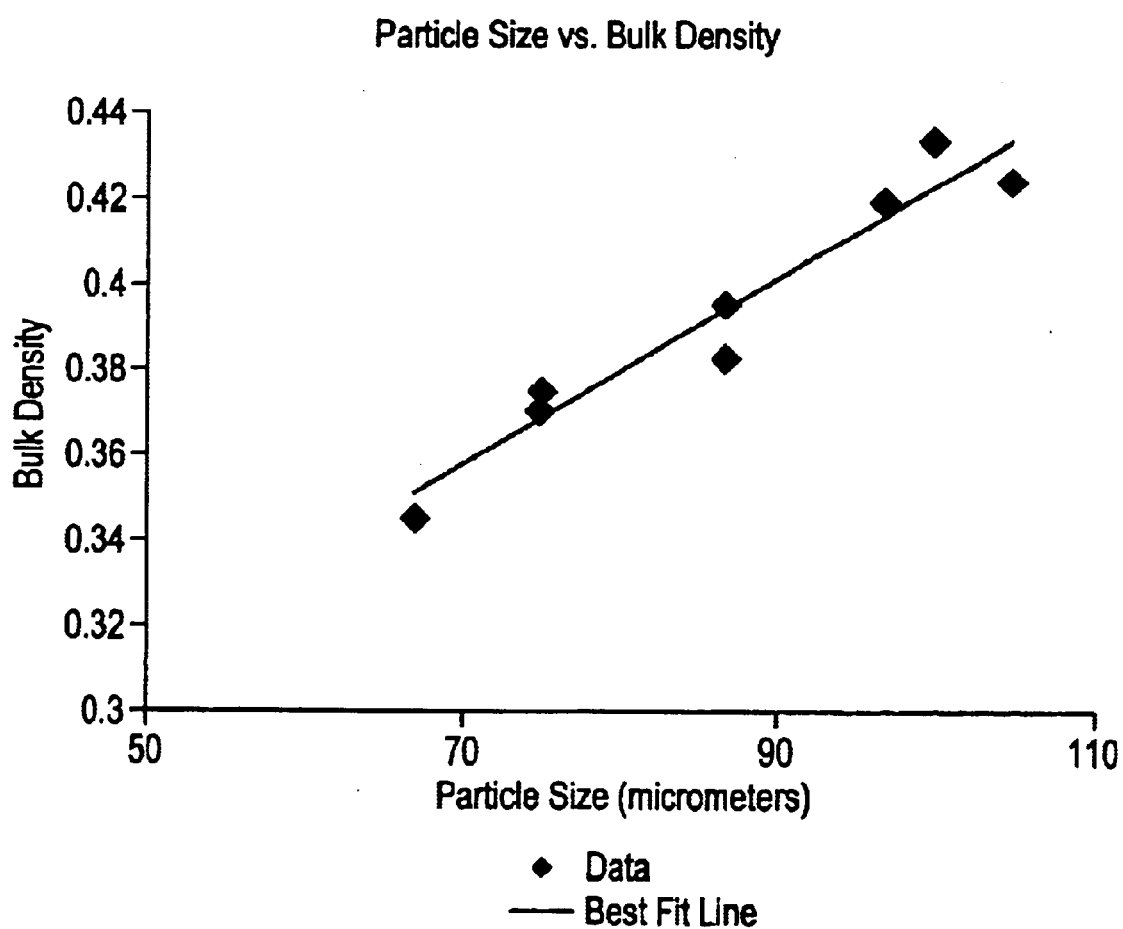
FIG. 3 is a plot of bulk density versus particle size measured within 115 seconds of combining a poly(arylene ether) solution 510 and an antisolvent.
Figure 4:
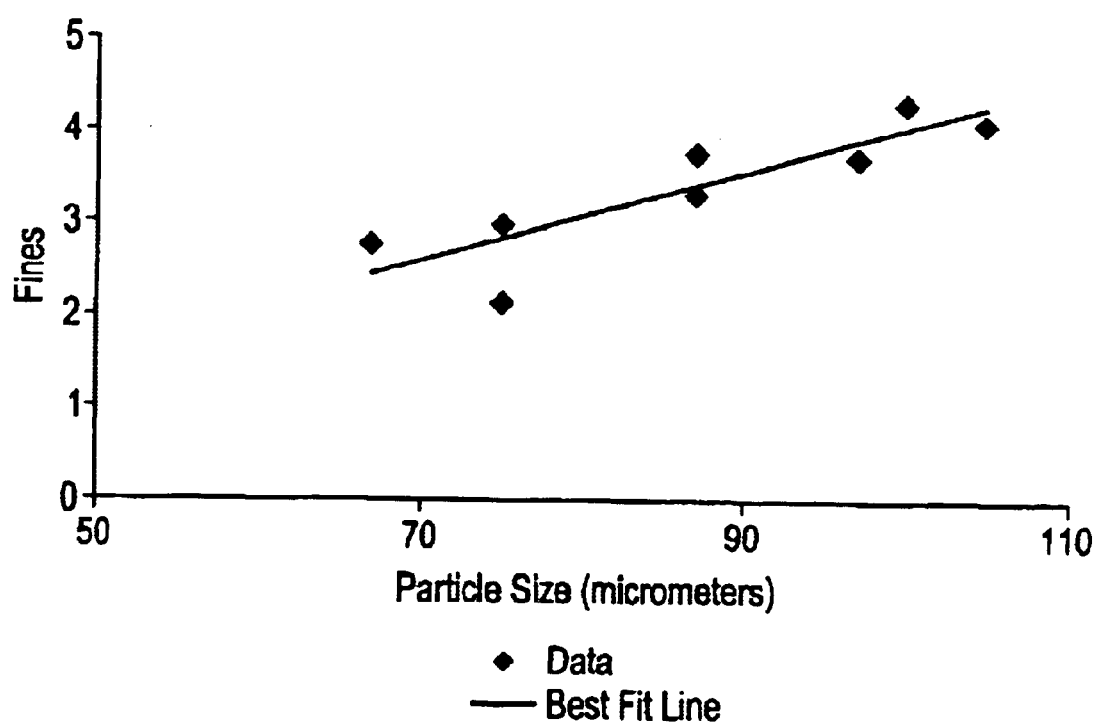
FIG. 4 is plot of the fines content of the final isolated resin versus particle size measured within 15 seconds of combining a poly(arylene ether) solution 510 and an antisolvent.

A process similar to that described in Examples 1–9 was used to produce a poly (2,6-dimethyl-1,4-phenylene ether) having an intrinsic viscosity of 0.40 dL/g. Variations in production rate, and water and methanol composition of the antisolvent were used to produce eight samples varying from about 65 to about 105 micrometers in their mean particle size measured 15 seconds after dispersion formation. The corresponding final products (i.e., the poly(arylene ether) powders obtained after filtration and drying) were analyzed to determine their bulk density and fines content, and the relationships between these final product properties and particle size were explored through linear regression. The results are presented in Table 2 and FIGS. 3 and 4. The results for bulk density, depicted in FIG. 3, show that there is a strong correlation between increasing particle size and increasing bulk density. The results for fines content (i.e., the weight percent of particles less than 28 micrometers) depicted in FIG. 4, show, surprisingly, that there is a strong correlation between increasing particle size and increasing weight percent of fines. This example shows that a final product property may correlate to the mean particle size measured early in the precipitation. When combined with the results of Example 1, this example further shows that final product properties may be predictably manipulated through changes in precipitation parameters.

[t2]

TABLE 2

| | Particle size (micrometers) | Bulk density (g/mL) | fines content (wt %) |
|---|---|---|---|
| Ex. 10 | 97 | 0.418 | 3.68 |
| Ex. 11 | 75 | 0.374 | 2.95 |
| Ex. 12 | 100 | 0.432 | 4.25 |
| Ex. 13 | 105 | 0.424 | 4.04 |
| Ex. 14 | 87 | 0.382 | 3.30 |
| Ex. 15 | 75 | 0.369 | 2.10 |
| Ex. 16 | 87 | 0.394 | 3.70 |
| Ex. 17 | 67 | 0.345 | 2.75 |

EXAMPLES 18 TO 22

Figure 5:
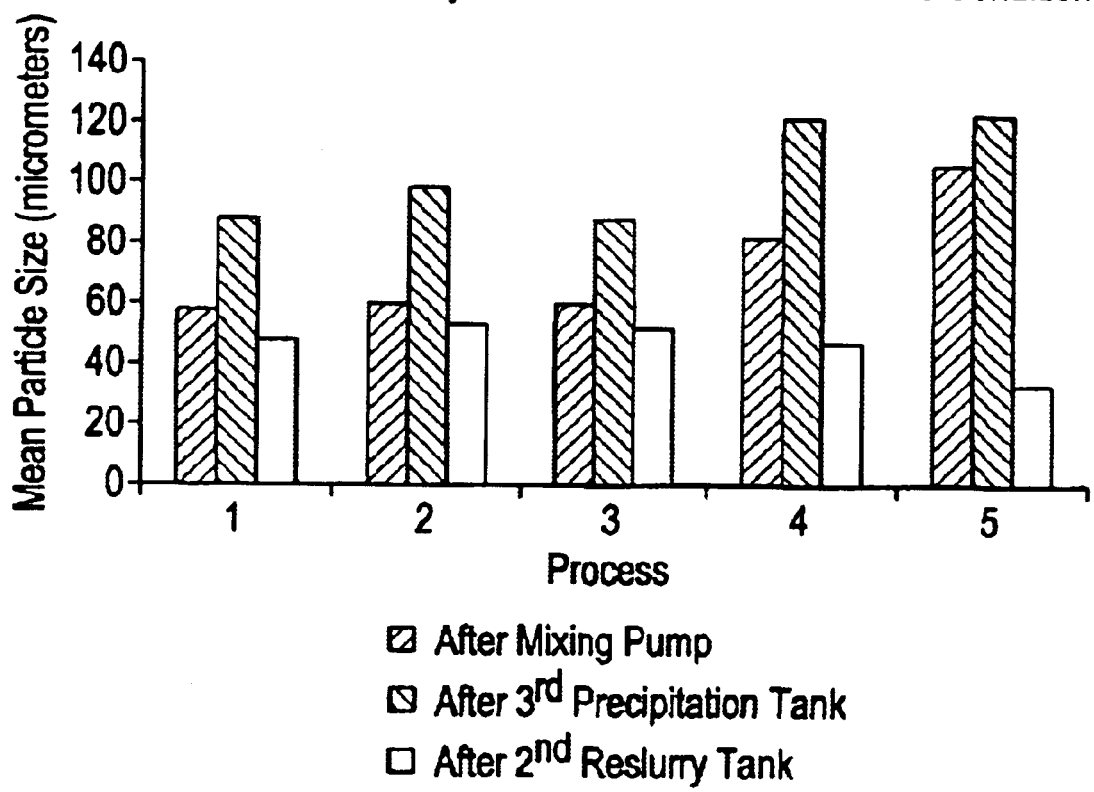
FIG. 5 is a bar chart of particle size as a function of location in the apparatus (after mixing pump 40, after third precipitation tank 100, and after second reslurry tank 160) for initial particle sizes (i.e., particles sizes after mixing pump 40) of about 60 micrometers (1–3), 80 micrometers (4), and 105 micrometers (5).

The process of Examples 1–9 was conducted and particle size distributions were determined at three positions in the process. The first position was about 15 seconds downstream of the mixing pump 40. The second position was in the outlet of the third precipitation tank 100. The third position was at the outlet of second reslurry tank 160. The results, presented in Table 3 and plotted in FIG. 5, illustrate the changes in particle size that take place over time as the poly(arylene ether) solid is formed in the initial dispersion (i.e., just after mixing pump 40), in the third precipitation tank 100, and in the second reslurry tank 160. These experiments show, surprisingly, that larger the particle sizes observed after mixing pump 40 yield smaller particle sizes in the second reslurry tank 160.

[t3]

TABLE 3

| | Particle size after mixing pump 40 (micrometers) | Particle size after third precipitation tank 100 (micrometers) | Particle size after second reslurry tank 160 (micrometers) |
|---|---|---|---|
| Ex. 18 | 58 | 88 | 48 |
| Ex. 19 | 59 | 98 | 53 |
| Ex. 20 | 60 | 87 | 51 |
| Ex. 21 | 81 | 119 | 46 |
| Ex. 22 | 105 | 121 | 32 |

EXAMPLE 23

Figure 6:
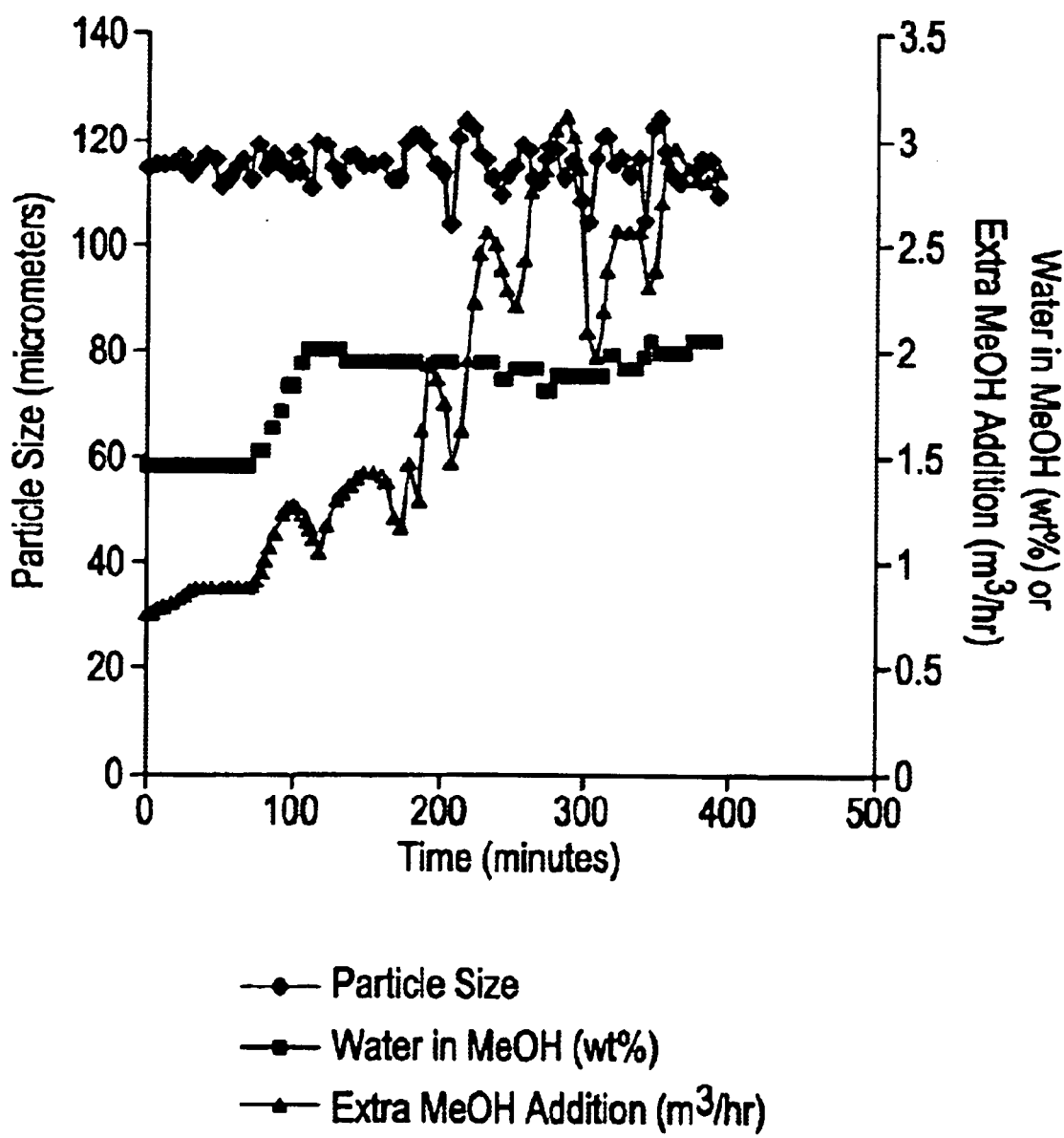
FIG. 6 is plot of particle size versus time showing use of supplemental methanol at the mixing pump 40 to control particle size in response to a change in the water content of recycled methanol.

This example illustrates one way to control particle size automatically. Using an apparatus similar to that depicted in FIG. 2, poly(2,6-dimethyl-1,4-phenylene ether) particle size was automatically maintained between about 110 and 125 micrometers by adjusting the flow from methanol supplemental antisolvent tank 230 and mixing pump 40 in response to particle size measurement at the outlet of mixing pump 40. When the water content in the recycled methanol stream (recovered antisolvent 600) increased due to normal function of the apparatus, the additional methanol flow was increased by up to 3-fold to maintain the desired particle size. Data are presented in Table 4 and FIG. 6. No lump formation or blockages occurred.
[t4]

TABLE 4

| time (minutes) | Particle Size (micrometers) | Water in MeOH (wt %) | Supplemental MeOH addition (m³/h) |
|---|---|---|---|
| 0 | 114.36 | 1.46 | 0.767 |
| 5 | 115.26 | 1.46 | 0.781 |
| 10 | 115.43 | 1.46 | 0.795 |
| 15 | 115.98 | 1.46 | 0.808 |
| 20 | 115.31 | 1.46 | 0.830 |
| 25 | 116.87 | 1.46 | 0.858 |
| 30 | 113.44 | 1.46 | 0.870 |
| 35 | 115.24 | 1.46 | 0.877 |
| 40 | 117.09 | 1.46 | 0.884 |
| 45 | 115.79 | 1.46 | 0.891 |
| 50 | 111.32 | 1.46 | 0.891 |
| 55 | 113.13 | 1.46 | 0.880 |
| 60 | 114.79 | 1.46 | 0.876 |
| 65 | 116.42 | 1.46 | 0.884 |
| 70 | 112.79 | 1.46 | 0.893 |
| 75 | 119.33 | 1.53 | 0.969 |
| 80 | 114.99 | 1.53 | 1.061 |
| 85 | 117.32 | 1.63 | 1.155 |
| 90 | 114.78 | 1.71 | 1.250 |
| 95 | 114.09 | 1.83 | 1.256 |
| 100 | 117.91 | 1.83 | 1.246 |
| 105 | 113.40 | 1.94 | 1.193 |
| 110 | 111.11 | 2.00 | 1.126 |
| 115 | 119.51 | 2.00 | 1.060 |
| 120 | 119.32 | 2.00 | 1.194 |
| 125 | 115.05 | 2.00 | 1.302 |
| 130 | 112.69 | 2.00 | 1.331 |
| 135 | 116.52 | 1.94 | 1.359 |
| 140 | 117.32 | 1.94 | 1.399 |
| 145 | 114.78 | 1.94 | 1.415 |
| 150 | 115.60 | 1.94 | 1.407 |
| 155 | 115.30 | 1.94 | 1.400 |
| 160 | 115.67 | 1.94 | 1.393 |
| 165 | 112.71 | 1.94 | 1.222 |
| 170 | 112.28 | 1.94 | 1.159 |
| 175 | 119.59 | 1.94 | 1.466 |
| 180 | 120.96 | 1.94 | 1.310 |
| 185 | 121.12 | 1.94 | 1.620 |
| 190 | 119.29 | 1.94 | 1.930 |
| 195 | 115.01 | 1.94 | 1.877 |
| 200 | 113.25 | 1.94 | 1.768 |
| 205 | 103.79 | 1.94 | 1.485 |
| 210 | 120.65 | 1.94 | 1.634 |
| 215 | 123.62 | 1.94 | 1.953 |
| 220 | 122.37 | 1.94 | 2.235 |
| 225 | 117.18 | 1.94 | 2.470 |
| 230 | 116.46 | 1.94 | 2.545 |
| 235 | 112.85 | 1.94 | 2.509 |
| 240 | 110.10 | 1.86 | 2.383 |
| 245 | 113.28 | 1.86 | 2.291 |
| 250 | 114.87 | 1.91 | 2.212 |
| 255 | 119.26 | 1.91 | 2.447 |
| 260 | 117.51 | 1.91 | 2.760 |
| 265 | 112.56 | 1.91 | 2.765 |
| 270 | 116.17 | 1.82 | 2.861 |
| 275 | 118.76 | 1.82 | 2.959 |
| 280 | 118.34 | 1.87 | 3.053 |
| 285 | 112.94 | 1.87 | 3.113 |
| 290 | 115.72 | 1.87 | 3.017 |
| 295 | 108.31 | 1.87 | 2.886 |
| 300 | 104.58 | 1.87 | 2.087 |
| 305 | 116.48 | 1.87 | 1.981 |
| 310 | 121.14 | 1.87 | 2.186 |
| 315 | 121.08 | 1.96 | 2.390 |
| 320 | 115.30 | 1.96 | 2.556 |

TABLE 4-continued

| time (minutes) | Particle Size (micrometers) | Water in MeOH (wt %) | Supplemental MeOH addition (m³/h) |
|---|---|---|---|
| 325 | 116.12 | 1.91 | 2.555 |
| 330 | 113.32 | 1.91 | 2.554 |
| 335 | 115.70 | 1.91 | 2.552 |
| 340 | 104.41 | 1.96 | 2.307 |
| 345 | 122.38 | 2.03 | 2.373 |
| 350 | 124.50 | 1.98 | 2.705 |
| 355 | 117.61 | 1.98 | 2.922 |
| 360 | 113.14 | 1.98 | 2.950 |
| 365 | 112.46 | 1.98 | 2.904 |
| 370 | 113.31 | 1.98 | 2.863 |
| 375 | 113.55 | 2.04 | 2.823 |
| 380 | 116.37 | 2.04 | 2.783 |
| 385 | 116.38 | 2.04 | 2.828 |
| 390 | 109.85 | 2.04 | 2.836 |
| 395 | 116.52 | 2.04 | 2.774 |
| 400 | 114.58 | 2.04 | 3.088 |

EXAMPLE 24

Figure 7:
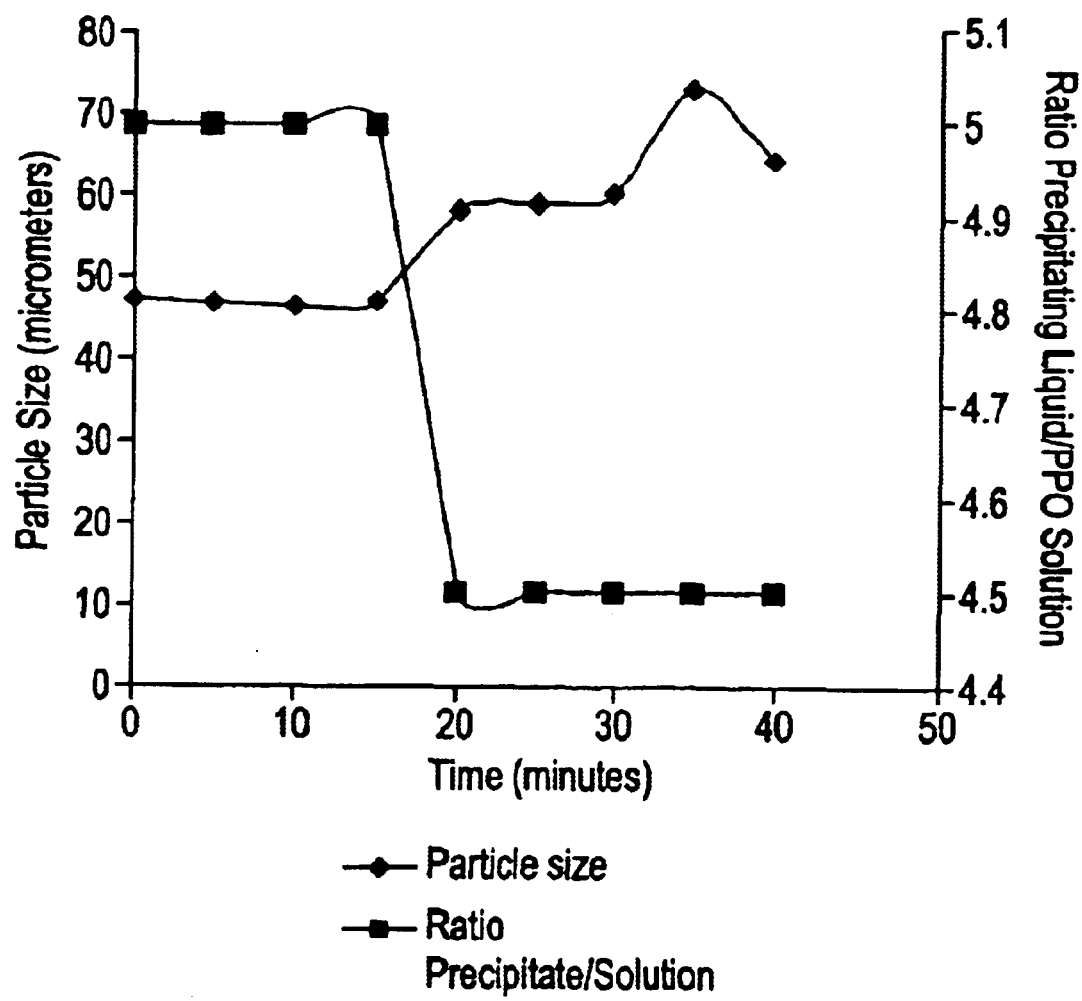
FIG. 7 is a plot of particle size versus time showing use of a change in the ratio of antisolvent to poly(arylene ether) solution 510 to increase particle size.

In this following example, a process to produce poly(2,6-dimethyl-1,4-phenylene ether) having an intrinsic viscosity of 0.40 dL/g was started up after a shut-down period. The target particle size was 60–70 microns. During start-up, the particle size was found to be too small, so the volume ratio of antisolvent (a methanol-rich mixture of methanol, toluene and water) to poly(phenylene ether) solution (poly (phenylene ether) in toluene) was reduced from 5 to 4.5. This action reduced the methanol concentration in the high shear precipitation pump quickly, leading to the desired increased particle size. Data are presented in Table 5 and FIG. 7.
[t7]

TABLE 5

| Time (minutes) | Particle size (micrometers) | Antisolvent/PPE Solution volume ratio |
|---|---|---|
| 0 | 46.86 | 5 |
| 5 | 46.79 | 5 |
| 10 | 46.44 | 5 |
| 15 | 46.54 | 5 |
| 20 | 57.97 | 4.5 |
| 25 | 58.79 | 4.5 |
| 30 | 59.93 | 4.5 |
| 35 | 72.93 | 4.5 |
| 40 | 64.45 | 4.5 |

EXAMPLE 25

Figure 8:
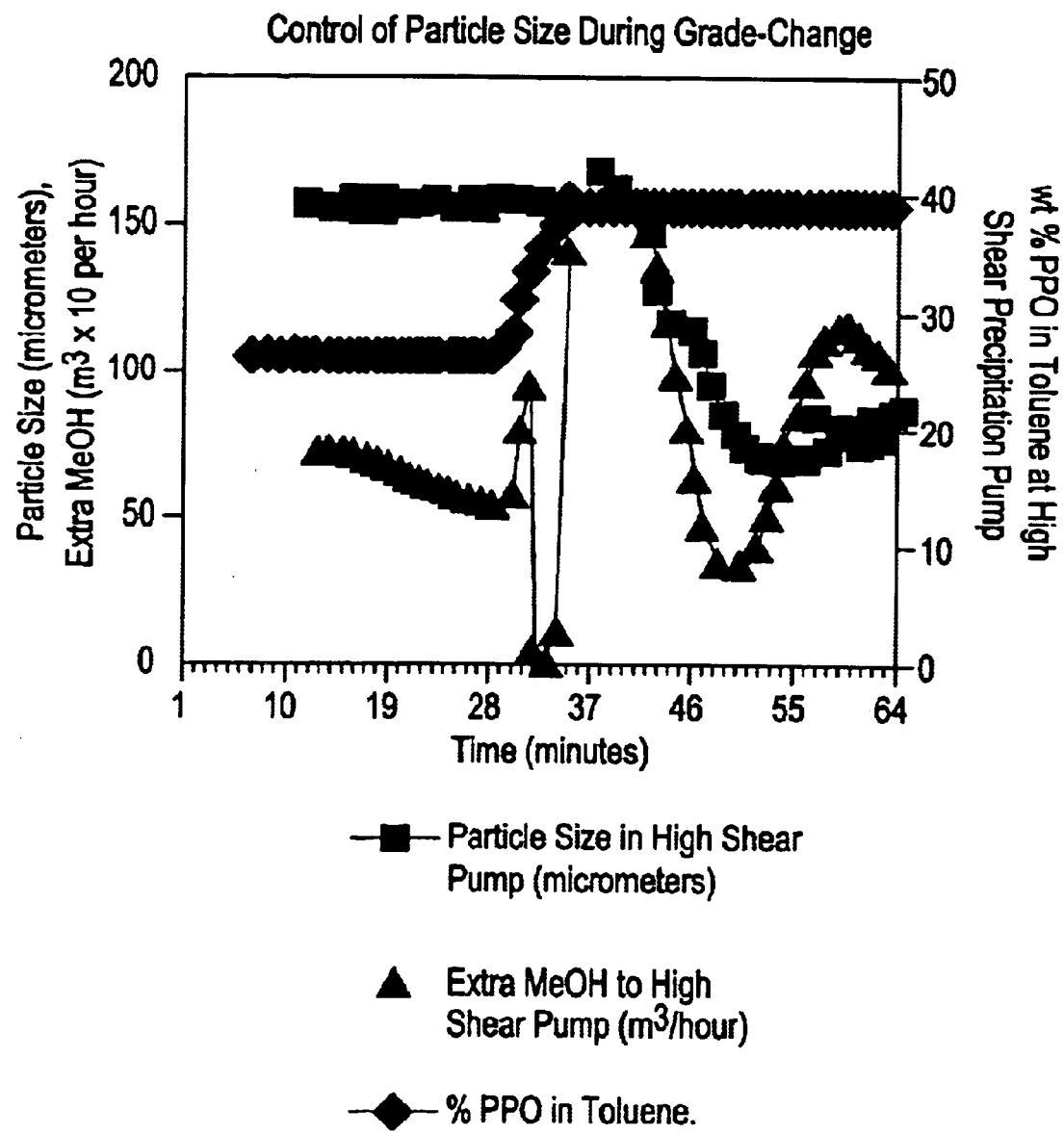
FIG. 8 is a plot of particle size versus time showing use of supplemental methanol at the mixing pump 40 to control particle size during a changeover in the production of from a higher intrinsic viscosity poly(arylene ether) to a lower intrinsic viscosity poly (arylene ether).

Often the same apparatus is used to produce various grades of polyphenylene ethers having different compositions and/or intrinsic viscosities. This example illustrates automated control of particle size during a change from production of a poly(phenylene ether) having an intrinsic viscosity of 0.57 dL/g to production of a poly (phenylene ether) having an intrinsic viscosity of 0.40 dL/g. The 0.57 dL/g material had a desired particle size of 150–160 micrometers measured at the exit of the mixing pump 40, while the 0.40 dL/g material had a desired particle size of 80–90 micrometers. This grade change is particularly difficult to control, as both solids content (and hence quantity of toluene to the high-shear precipitation pump) and desired particle size change at the same time. However, using particle size analysis at the exit of the mixing pump and automatic adjustment of supplemental methanol feed to the mixing pump, it was possible to obtain a smooth grade transition, as illustrated in the Table 6 and FIG. 8.

[t6]

TABLE 6

| Time (minutes) | particle size (micrometers) | Supplemental MeOH to mixing pump ($m^3 \times 10$/h) | % PPE in Toluene (wt %) |
|---|---|---|---|
| 0 | 156.43 | 18.04 | 26.36 |
| 5 | 155.85 | 17.95 | 26.52 |
| 10 | 155.87 | 17.86 | 26.58 |
| 15 | 155.85 | 17.76 | 26.78 |
| 20 | 158.74 | 17.67 | 26.5 |
| 25 | 159.76 | 17.81 | 26.49 |
| 30 | 154.86 | 18.09 | 26.85 |
| 35 | 159.37 | 18.37 | 26.48 |
| 40 | 156.82 | 18.65 | 26.63 |
| 45 | 156.25 | 18.32 | 26.46 |
| 50 | 156.04 | 17.96 | 26.36 |
| 55 | 157.94 | 17.68 | 26.66 |
| 60 | 156.49 | 17.40 | 26.52 |
| 65 | 154.54 | 17.11 | 26.59 |
| 70 | 154.89 | 16.83 | 26.38 |
| 75 | 158.65 | 16.51 | 26.19 |
| 80 | 153.60 | 16.11 | 26.71 |
| 85 | 157.47 | 15.72 | 26.53 |
| 90 | 156.44 | 15.33 | 26.63 |
| 95 | 159.16 | 14.93 | 26.44 |
| 100 | 155.34 | 14.54 | 26.33 |
| 105 | 158.64 | 14.15 | 26.39 |
| 110 | 155.83 | 13.95 | 26.41 |
| 115 | 154.50 | 13.78 | 26.71 |
| 120 | 155.49 | 13.61 | 26.38 |
| 125 | 156.11 | 13.43 | 26.47 |
| 130 | 168.34 | 14.70 | 28.28 |
| 135 | 166.76 | 20.20 | 31.24 |
| 140 | 162.71 | 23.80 | 33.6 |
| 145 | 158.18 | 0.79 | 35.19 |
| 150 | 160.55 | 0.41 | 37.01 |
| 155 | 148.84 | 2.97 | 38.42 |
| 160 | 127.86 | 35.58 | 39.37 |
| 165 | 116.09 | 39.86 | 39.34 |
| 170 | 115.41 | 39.87 | 39.18 |
| 175 | 113.37 | 39.89 | 39.08 |
| 180 | 106.01 | 39.90 | 38.92 |
| 185 | 95.39 | 39.91 | 39.16 |
| 190 | 85.16 | 39.93 | 39.35 |
| 195 | 79.13 | 39.94 | 39.58 |
| 200 | 75.12 | 37.38 | 39.79 |
| 205 | 71.96 | 33.94 | 39.81 |
| 210 | 69.99 | 29.65 | 39.64 |
| 215 | 69.77 | 25.06 | 39.44 |
| 220 | 69.26 | 20.46 | 39.62 |
| 225 | 72.13 | 15.86 | 39.57 |
| 230 | 72.24 | 12.42 | 39.35 |
| 235 | 73.87 | 9.34 | 39.17 |
| 240 | 80.22 | 8.86 | 39.29 |
| 245 | 77.98 | 8.99 | 39.55 |
| 250 | 81.49 | 9.12 | 39.78 |
| 255 | 83.24 | 10.17 | 39.64 |
| 260 | 87.15 | 12.64 | 39.76 |
| 265 | 86.05 | 15.63 | 39.57 |
| 270 | 85.94 | 18.69 | 39.65 |
| 275 | 88.64 | 21.71 | 39.51 |
| 280 | 86.36 | 24.70 | 39.42 |
| 285 | 83.66 | 27.06 | 39.39 |
| 290 | 84.86 | 28.12 | 39.52 |
| 295 | 81.96 | 29.18 | 39.57 |
| 300 | 78.83 | 28.97 | 39.66 |
| 305 | 81.10 | 28.55 | 39.43 |
| 310 | 80.13 | 27.74 | 39.64 |
| 315 | 77.38 | 26.73 | 39.59 |
| 320 | 78.71 | 25.72 | 39.4 |
| 325 | 79.67 | 24.70 | 39.47 |
| 330 | 80.17 | 23.57 | 39.34 |
| 335 | 77.84 | 22.45 | 39.48 |
| 340 | 76.36 | 21.30 | 39.67 |
| 345 | 79.41 | 20.14 | 39.52 |
| 350 | 81.48 | 18.99 | 39.41 |
| 355 | 81.58 | 18.35 | 39.61 |
| 360 | 80.70 | 18.37 | 39.4 |
| 365 | 83.63 | 18.39 | 39.26 |
| 370 | 84.69 | 1.89 | 39.51 |

EXAMPLE 26

Figure 9:
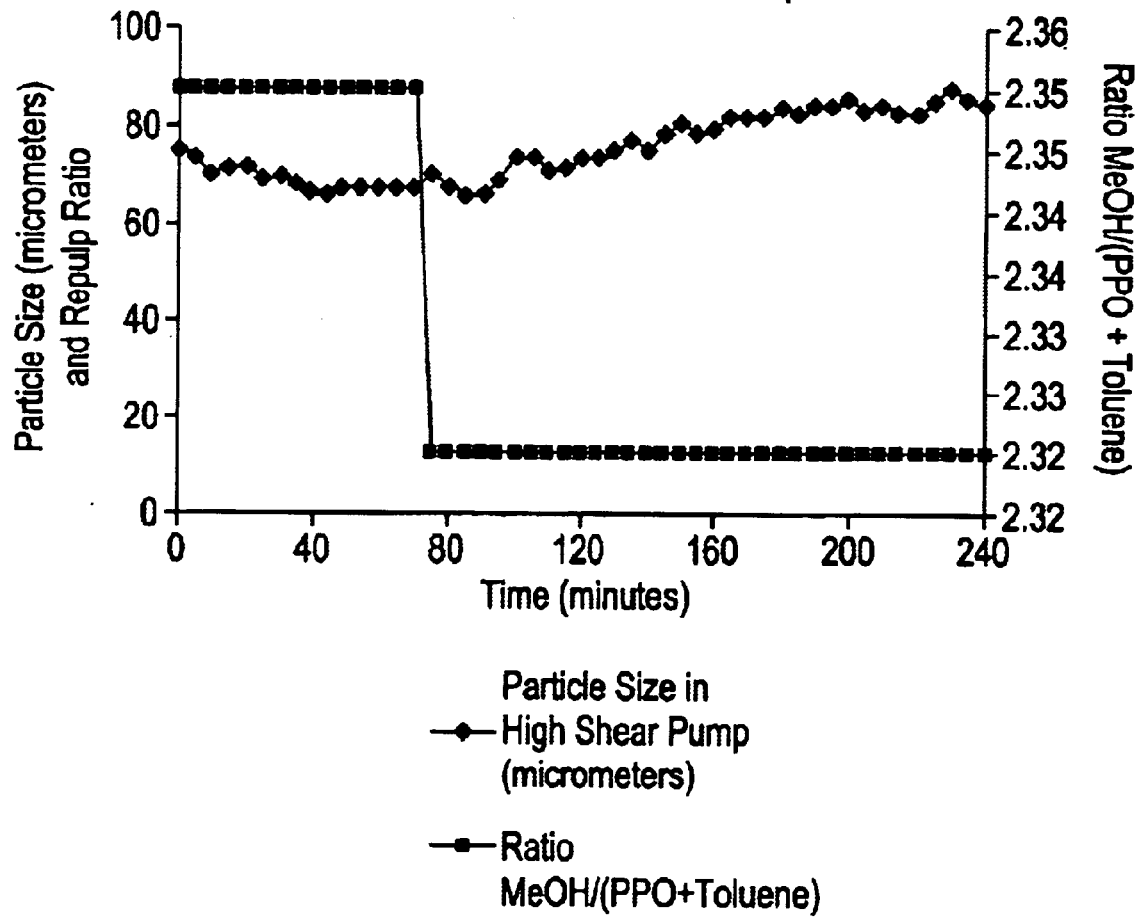
FIG. 9 is a plot of particle size versus time showing the use of a change in the ratio of antisolvent to poly(arylene ether) solution 510 pump to control particle size during a changeover in the production of a higher intrinsic viscosity poly(arylene ether) to a lower intrinsic viscosity poly (arylene ether).

A switch was made from a grade having an intrinsic viscosity of 0.45 dL/g (with a desired particle size of 70–80 micrometers) to a grade having an intrinsic viscosity of 0.41 dL/g (with a desired particle size of 75–85 micrometers). The particle size was maintained by adjusting the volume ratio of methanol to PPE/toluene solution via control of extra methanol from supplemental antisolvent tank 230 in response to particle size measurements at the exit of the mixing pump. In the data in Table 7, below, and FIG. 9, the grade change was done at exactly 40 minutes, and the target particle size of 80 micrometers was reached after 150 minutes.

[t9]

TABLE 7

| time (minutes) | PS high shear pump | Volume RatioMeOH/ (PPO + toluene) | extra MeOH to high shear pump ($m^3$/h) | Solids in PPO/toluene (wt %) |
|---|---|---|---|---|
| 0 | 74.64 | 2.35 | 0.2249 | 38.80 |
| 5 | 73.30 | 2.35 | 0.3648 | 38.89 |
| 10 | 70.29 | 2.35 | 0.0735 | 38.98 |
| 15 | 71.15 | 2.35 | 0.1599 | 39.08 |
| 20 | 71.38 | 2.35 | 0.3208 | 39.18 |
| 25 | 69.28 | 2.35 | 0.2570 | 39.28 |
| 30 | 69.37 | 2.35 | 0.2546 | 39.39 |
| 35 | 68.09 | 2.35 | 0.2984 | 39.49 |
| 40 | 66.81 | 2.35 | 0.3651 | 39.59 |
| 45 | 65.95 | 2.35 | 0.3614 | 39.63 |
| 50 | 67.38 | 2.35 | 0.0078 | 39.52 |
| 55 | 67.01 | 2.35 | 0.0079 | 39.55 |
| 60 | 67.10 | 2.35 | 0.0079 | 39.58 |
| 65 | 67.19 | 2.35 | 0.0079 | 39.61 |
| 70 | 67.28 | 2.35 | 0.0079 | 39.64 |
| 75 | 70.07 | 2.32 | 0.0080 | 39.67 |
| 80 | 67.59 | 2.32 | 0.0080 | 39.71 |
| 85 | 65.63 | 2.32 | 0.0080 | 39.75 |
| 90 | 66.38 | 2.32 | 0.0080 | 39.72 |
| 95 | 69.06 | 2.32 | 0.0081 | 39.53 |
| 100 | 74.06 | 2.32 | 0.0081 | 39.35 |
| 105 | 73.59 | 2.32 | 0.0081 | 39.47 |
| 110 | 70.77 | 2.32 | 0.0081 | 39.59 |
| 115 | 71.73 | 2.32 | 0.0082 | 39.59 |
| 120 | 73.37 | 2.32 | 0.0082 | 39.53 |
| 125 | 73.33 | 2.32 | 0.0082 | 39.46 |
| 130 | 74.89 | 2.32 | 0.0082 | 39.38 |
| 135 | 77.09 | 2.32 | 0.0083 | 39.31 |
| 140 | 75.60 | 2.32 | 0.0083 | 39.37 |
| 145 | 78.62 | 2.32 | 0.0083 | 39.42 |
| 150 | 80.70 | 2.32 | 0.0083 | 39.45 |
| 155 | 78.94 | 2.32 | 0.0084 | 39.48 |
| 160 | 79.47 | 2.32 | 0.0084 | 39.51 |
| 165 | 82.35 | 2.32 | 0.0084 | 39.54 |
| 170 | 82.22 | 2.32 | 0.0085 | 39.56 |
| 175 | 82.29 | 2.32 | 0.0085 | 39.56 |
| 180 | 84.18 | 2.32 | 0.0085 | 39.56 |
| 185 | 82.99 | 2.32 | 0.0085 | 39.55 |
| 190 | 84.44 | 2.32 | 0.0086 | 39.55 |

TABLE 7-continued

| time (minutes) | PS high shear pump | Volume RatioMeOH/ (PPO + toluene) | extra MeOH to high shear pump (m³/h) | Solids in PPO/toluene (wt %) |
|---|---|---|---|---|
| 195 | 84.56 | 2.32 | 0.0086 | 39.54 |
| 200 | 85.30 | 2.32 | 0.0086 | 39.53 |
| 205 | 83.75 | 2.32 | 0.0086 | 39.49 |
| 210 | 84.55 | 2.32 | 0.0087 | 39.45 |
| 215 | 83.02 | 2.32 | 0.0087 | 39.41 |
| 220 | 83.30 | 2.32 | 0.0087 | 39.37 |
| 225 | 85.34 | 2.32 | 0.0087 | 39.33 |
| 230 | 88.03 | 2.32 | 0.0088 | 39.31 |
| 235 | 86.17 | 2.32 | 0.0088 | 39.34 |
| 240 | 84.86 | 2.32 | 0.0088 | 39.38 |

EXAMPLE 27

Figure 10:
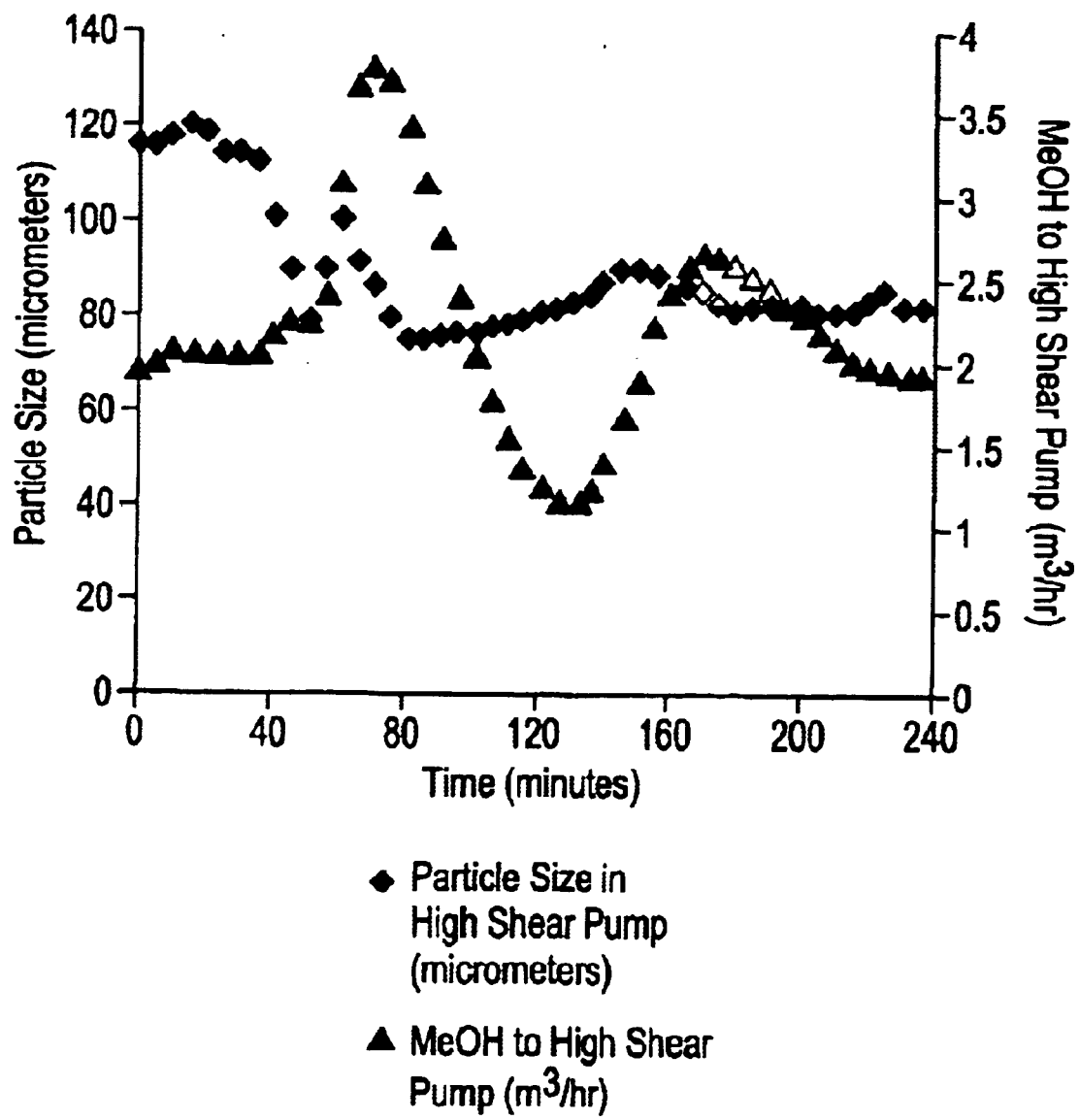
FIG. 10 is a plot of particle size versus time showing the use of a change in the ratio of antisolvent to poly(arylene ether) solution 510 and a change in the amount of supplemental methanol at the mixing pump 40 to control particle size during a changeover in the production of from a higher intrinsic viscosity poly(arylene ether) to a lower intrinsic viscosity poly(arylene ether).

This example illustrates a rapid approach to particle size equilibrium during a grade change from 0.45 dL/g to 0.41 dL/g poly(2,6-dimethyl-1,4-phenylene ether). Particle size was automatically controlled by adjusting the volume ratio of methanol to PPE/toluene solution and the flow of extra methanol to the feed pump, both in response to the particle size at the mixing pump exit. In the data in Table 8, below, and FIG. 10, the grade change was done at exactly 40 minutes, and the target particle size of 80 microns was reached after 70 minutes.

[t11]

TABLE 8

| time (minutes) | particle size (micrometers) | Volume Ratio MeOH/ (PPE + toluene) | extra MeOH to mixing pump (m³/h) | Solids in PPE/toluene (wt %) |
|---|---|---|---|---|
| 0 | 116.38 | 2.12 | 1.949 | 38.36 |
| 5 | 115.85 | 2.12 | 2.016 | 38.53 |
| 10 | 117.66 | 2.12 | 2.062 | 38.65 |
| 15 | 120.29 | 2.12 | 2.054 | 38.53 |
| 20 | 118.56 | 2.2 | 2.054 | 38.80 |
| 25 | 114.73 | 2.2 | 2.056 | 39.02 |
| 30 | 114.27 | 2.2 | 2.057 | 39.13 |
| 35 | 112.47 | 2.2 | 2.058 | 39.25 |
| 40 | 101.38 | 2.2 | 2.174 | 39.91 |
| 45 | 89.59 | 2.2 | 2.258 | 40.43 |
| 50 | 79.04 | 2.2 | 2.237 | 40.86 |
| 55 | 89.06 | 2.2 | 2.431 | 40.69 |
| 60 | 100.64 | 2.26 | 3.101 | 39.83 |
| 65 | 91.02 | 2.26 | 3.657 | 39.15 |
| 70 | 86.03 | 2.26 | 3.761 | 39.02 |
| 75 | 79.28 | 2.26 | 3.694 | 39.33 |
| 80 | 74.94 | 2.26 | 3.438 | 39.69 |
| 85 | 74.33 | 2.26 | 3.089 | 39.88 |
| 90 | 75.01 | 2.26 | 2.739 | 39.87 |
| 95 | 75.87 | 2.26 | 2.389 | 39.72 |
| 100 | 75.15 | 2.26 | 2.039 | 39.62 |
| 105 | 77.08 | 2.26 | 1.780 | 39.35 |
| 110 | 78.28 | 2.26 | 1.540 | 39.44 |
| 115 | 78.31 | 2.26 | 1.349 | 39.19 |
| 120 | 80.61 | 2.26 | 1.238 | 39.25 |
| 125 | 81.24 | 2.26 | 1.128 | 39.28 |
| 130 | 82.73 | 2.26 | 1.134 | 39.64 |
| 135 | 83.89 | 2.2 | 1.216 | 39.60 |
| 140 | 86.92 | 2.2 | 1.383 | 39.52 |
| 145 | 89.39 | 2.2 | 1.655 | 39.60 |
| 150 | 89.45 | 2.2 | 1.927 | 39.48 |
| 155 | 88.31 | 2.2 | 2.200 | 39.36 |
| 160 | 85.41 | 2.2 | 2.414 | 39.43 |
| 165 | 86.36 | 2.2 | 2.588 | 39.30 |
| 170 | 84.65 | 2.2 | 2.643 | 39.38 |
| 175 | 82.08 | 2.2 | 2.629 | 39.43 |

TABLE 8-continued

| time (minutes) | particle size (micrometers) | Volume Ratio MeOH/ (PPE + toluene) | extra MeOH to mixing pump (m³/h) | Solids in PPE/toluene (wt %) |
|---|---|---|---|---|
| 180 | 80.31 | 2.2 | 2.585 | 39.49 |
| 185 | 81.17 | 2.2 | 2.510 | 39.58 |
| 190 | 82.04 | 2.2 | 2.435 | 39.62 |
| 195 | 82.06 | 2.2 | 2.351 | 39.50 |
| 200 | 80.84 | 2.2 | 2.264 | 39.30 |
| 205 | 80.69 | 2.2 | 2.178 | 39.35 |
| 210 | 80.75 | 2.2 | 2.091 | 39.24 |
| 215 | 80.11 | 2.2 | 2.005 | 39.32 |
| 220 | 83.03 | 2.2 | 1.935 | 39.33 |
| 225 | 84.61 | 2.2 | 1.929 | 39.28 |
| 230 | 80.91 | 2.2 | 1.923 | 39.52 |
| 235 | 80.97 | 2.2 | 1.917 | 39.59 |

Examples 27 and 28 collectively illustrate the use of real-time, in-line particle size measurements to rapidly adjust precipitation conditions. They also illustrate that some factors, such as PPT ratio and extra methanol feed to the high shear precipitation pump affect particle size quickly, while others, such as the ratio of antisolvent to poly(arylene ether) solution, act more slowly.

EXAMPLE 28

Figure 11:
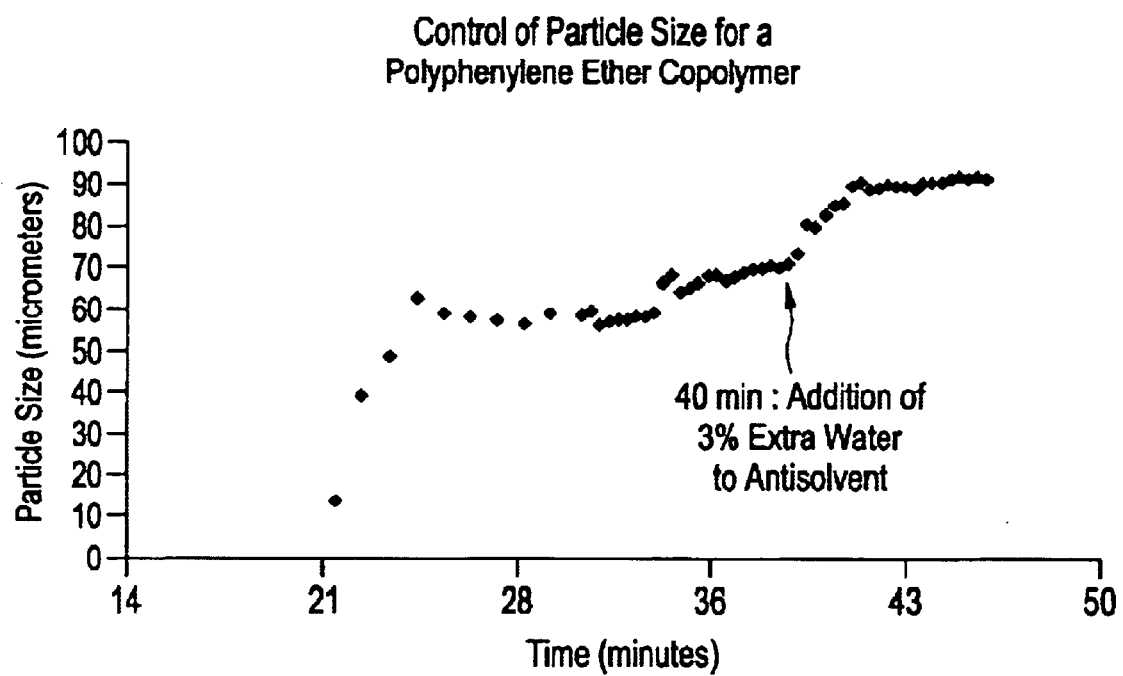
FIG. 11 is a plot of particle size versus time showing the use of a change in antisolvent water content to increase particle size during a start-up of poly(arylene ether) copolymer production.

A process similar to that described in Examples 1–9 was used to produce a poly (2,6-dimethyl-1,4-phenylene ether-co-2,3,6-dimethyl-1,4-phenylene ether) having an intrinsic viscosity of about 0.45 dL/g. Using an initial antisolvent composition of 80% methanol, 16.5% toluene and 3.5% water, a mean particle size of about 60 micrometers was measured approximately 15 seconds after high shear mixing of the poly(arylene ether) solution and the antisolvent (see FIG. 11, times of about 0:23 to 0:33), and filtration problems were observed. At a time corresponding to 0:40 in the Figure, the antisolvent composition was adjusted by increasing the water concentration to 5.1% and toluene concentration to 17.5% with a corresponding decrease in the methanol concentration. The mean particle size then stabilized at about 90 micrometers (see FIG. 11, times of about 0:41 to 0:45), and the filtration problem was eliminated. This example illustrates that the method is useful for quickly optimizing precipitation conditions. It also illustrates that the desired mean particle size measured soon after mixing a poly(arylene ether) solution and an antisolvent may vary as a function of poly(arylene ether) monomer composition and intrinsic viscosity.

EXAMPLE 29

During the production of a poly(2,6-dimethyl-1,4-phenylene ether) having an intrinsic viscosity of 0.41 dL/g, the cooling efficiency of the finished product cooler (which cools the product after drying from approximately 180–190° C. to approximately 50–60° C.) needed to be improved. It was found that the heat exchange characteristics of this cooler improve with smaller PPO particles. Therefore, the particle size at the mixing pump exit was increased using the techniques described above, leading to a decrease of particle size at drying and post-drying stages. Under otherwise identical production conditions, the change in downstream particle size enabled more efficient post-drying cooling, which was reflected in a cooler outlet temperature decrease of 10° C.

TABLE 9

| Particle Size at Mixing Pump Exit (micrometers) | Particle Size at dryer inlet (micrometers) | Temperature at Cooler Inlet (° C.) | Temperature at Cooler Outlet (° C.) |
|---|---|---|---|
| 82.7 | 51.8 | 186 | 58.8 |
| 90.2 | 40.6 | 186 | 48.6 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A method of precipitating a poly(arylene ether), comprising:
   preparing a poly(arylene ether) solution comprising a poly(arylene ether) and a solvent;
   combining said poly(arylene ether) solution with an antisolvent to form a poly(arylene ether) dispersion comprising a poly(arylene ether) solid;
   separating said poly(arylene ether) solid from said poly(arylene ether) dispersion to form an isolated poly(arylene ether) solid;
   determining a particle size distribution of said poly(arylene ether) solid prior to said separating said poly(arylene ether) solid from said poly(arylene ether) dispersion; and
   adjusting a precipitation parameter in response to said particle size distribution.

2. The method of claim 1, wherein said determining said particle size distribution is conducted within 1,000 seconds of said combining said poly(arylene ether) solution with said antisolvent.

3. The method of claim 1, wherein said determining said particle size distribution is conducted within 120 seconds of said combining said poly(arylene ether) solution with said antisolvent.

4. The method of claim 1, wherein said determining said particle size distribution is conducted within 30 seconds of said combining said poly(arylene ether) solution with said antisolvent.

5. The method of claim 1, wherein said determining said particle size distribution is conducted without substantially diverting or removing said poly(arylene ether) dispersion.

6. The method of claim 1, wherein said determining said particle size distribution is conducted continuously.

7. The method of claim 1, wherein said determining said particle size distribution is determined within 10 seconds.

8. The method of claim 1, wherein said determining said particle size distribution comprises a laser back-scattering technique.

9. The method of claim 1, wherein said determining said particle size distribution comprises a laser back-scattering technique providing particle counting.

10. The method of claim 1, wherein said adjusting a precipitation parameter value comprises adjusting the antisolvent composition.

11. The method of claim 10, wherein said adjusting said antisolvent composition increases the solubility of said poly(arylene ether) in said first poly (arylene ether) dispersion and/or decreases the coagulation tendency of said poly(arylene ether) in said first poly(arylene ether) dispersion.

12. The method of claim 10, wherein said adjusting said antisolvent composition decreases the solubility of said poly(arylene ether) in said first poly(arylene ether) dispersion and/or increases the coagulation tendency of said poly(arylene ether) in said first poly(arylene ether) dispersion.

13. The method of claim 10, wherein said antisolvent comprises a water concentration, and wherein said adjusting said antisolvent composition comprises changing said water concentration.

14. The method of claim 10, wherein said antisolvent comprises a toluene concentration, and wherein said adjusting said antisolvent composition comprises changing said toluene concentration.

15. The method of claim 10, wherein said antisolvent comprises an alkanol concentration, and wherein said adjusting said antisolvent composition comprises changing said alkanol concentration.

16. The method of claim 1, wherein said combining said poly(arylene ether) solution with said antisolvent is characterized by a volume ratio of said poly(arylene ether) solution to said antisolvent, and wherein said adjusting said precipitation parameter comprises changing said volume ratio.

17. The method of claim 1, wherein said adjusting a precipitation parameter comprises adjusting the antisolvent temperature.

18. The method of claim 1, wherein said adjusting a precipitation parameter comprises adjusting the poly(arylene ether) solution composition.

19. The method of claim 1, wherein said adjusting a precipitation parameter comprises adjusting the poly(arylene ether) solution temperature.

20. The method of claim 1, wherein said adjusting a precipitation parameter comprises adjusting the inlet pressure or outlet pressure of the mixing pump.

21. The method of claim 1, wherein said combining the poly(arylene ether) solution with said antisolvent is characterized by a shear rate, and wherein said adjusting a precipitation parameter comprises adjusting said shear rate.

22. The method of claim 1, wherein said poly(arylene ether) is a polymerization product of at least one monohydric phenol having the formula

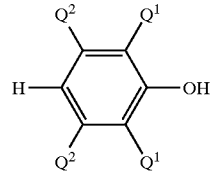

wherein each $Q^1$ is independently selected from the group consisting of halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, and $C_1$–$C_7$ halohydrocarbonoxy wherein at least two carbon atoms separate the halogen and oxygen atoms; and each $Q^2$ is independently selected from the group consisting of hydrogen, halogen, $C_1$–$C_7$ primary or secondary alkyl, phenyl, $C_1$–$C_7$ haloalkyl, $C_1$–$C_7$ hydrocarbonoxy, and $C_2$–$C_7$ halohydrocarbonoxy wherein at least two carbon atoms separate the halogen and oxygen atoms.

23. The method of claim 1, wherein said poly(arylene ether) has an intrinsic viscosity of about 0.2 to about 1.0 deciliters per gram measured at 25° C. in chloroform.

24. The method of claim 1, wherein said poly(arylene ether) has an intrinsic viscosity less than or equal to 0.65 deciliters per gram measured at 25° C. in chloroform.

25. The method of claim 1, wherein said poly(arylene ether) solution comprises about 10 to about 50 weight percent of said poly(arylene ether), based on the total weight of said poly(arylene ether) solution.

26. The method of claim 1, wherein said solvent comprises a $C_6$–$C_{18}$ aromatic hydrocarbon.

27. The method of claim 1, wherein said antisolvent comprises a compound selected from the group consisting of alkanols having one to about ten carbon atoms, ketones having three to about ten carbon atoms, alkanes having five to about ten carbon atoms, and combinations thereof.

28. The method of claim 1, wherein said antisolvent comprises an alkanol having one to about ten carbon atoms.

29. The method of claim 1, wherein said antisolvent comprises about 60 to 99.8 weight percent methanol, 0.1 to about 35 weight percent toluene, and 0.1 to about 10 weight percent water.

30. The method of claim 1, wherein said combining said poly(arylene ether) solution with said antisolvent comprises combining said poly(arylene ether) at a temperature of about 70° C. to about 100° C. with said antisolvent at a temperature of about 15° C. to about 60° C.

31. The method of claim 1, wherein combining said poly(arylene ether) solution with said antisolvent comprises mixing with a shear rate of about 500 sec$^{-1}$ to about 50,000 sec$^{-1}$.

32. The method of claim 1, wherein combining said poly(arylene ether) solution with said antisolvent comprises mixing in a stirred tank.

33. The method of claim 1, wherein said adjusting a precipitation parameter is performed within about 60 seconds of said determining said particle size distribution.

34. The method of claim 1, wherein said separating said poly(arylene ether) solid from said poly(arylene ether) dispersion comprises filtration.

35. The method of claim 1, wherein said isolated poly(arylene ether) solid has a mean particle size of about 20 micrometers to about 100 micrometers.

36. The method of claim 1, wherein said solvent is substantially free of any $C_1$–$C_6$ alkanol.

37. The method of claim 1, wherein said poly(arylene ether) solution is substantially free of particles greater than 1 micrometer.

38. The method of claim 1, further comprising determining a particle size distribution of said isolated poly(arylene ether) solid.

39. A method of precipitating a poly(arylene ether), comprising:

preparing a poly(arylene ether) solution comprising a poly(arylene ether) and a solvent, wherein said solvent comprises a $C_6$–$C_{18}$ aromatic hydrocarbon;

combining said poly(arylene ether) solution with an antisolvent to form a poly(arylene ether) dispersion, wherein said antisolvent comprises water and a compound selected from the group consisting of alkanols having one to about ten carbon atoms, ketones having three to about ten carbon atoms, alkanes having five to about ten carbon atoms, and combinations thereof;

determining a particle size distribution in said poly(arylene ether) dispersion within about 30 seconds of said combining said poly(arylene ether) solution with said antisolvent; and adjusting a precipitation parameter in response to said particle size distribution.

40. A method of precipitating a poly(arylene ether), comprising:

preparing a poly(arylene ether) solution comprising a poly(arylene ether) and a solvent; wherein said poly(arylene ether) is the polymerization product of a monohydric phenol comprising 2,6-dimethylphenol, 2,3,6-trimethylphenol, or a combination thereof; and wherein said solvent comprises toluene;

combining said poly(arylene ether) solution with an antisolvent to form a poly (arylene ether) dispersion; wherein said antisolvent comprises methanol, toluene and water;

determining a particle size distribution in said poly(arylene ether) dispersion within about 20 seconds of said combining said poly(arylene ether) solution with said antisolvent; and adjusting the antisolvent composition in response to said particle size distribution.

41. A method of preparing a poly(arylene ether), comprising:

oxidatively coupling a monohydric phenol using an oxygen-containing gas in the presence of a first solvent and a complex metal catalyst to produce a poly(arylene ether) solution;

combining said poly(arylene ether) solution with a first antisolvent to form a poly(arylene ether) dispersion comprising a poly(arylene ether) solid;

separating said poly(arylene ether) solid from said poly(arylene ether) dispersion to form an isolated poly(arylene ether) solid;

determining a particle size distribution of said poly(arylene ether) solid prior to said separating said poly(arylene ether) solid from said poly(arylene ether) dispersion; and adjusting a precipitation parameter in response to said particle size distribution.

42. The method of claim 41, further comprising concentrating said poly(arylene ether) solution) prior to said combining said poly(arylene ether) solution with said first antisolvent.

43. The method of claim 41, further comprising diluting said poly(arylene ether solution) with said first solvent prior to said combining said poly(arylene ether) solution with said first antisolvent.

* * * * *